United States Patent
Kim

(10) Patent No.: US 7,450,936 B2
(45) Date of Patent: Nov. 11, 2008

(54) SYSTEM AND METHOD FOR REMOTELY CONTROLLING A MOBILE TERMINAL

(75) Inventor: Jong-Hwan Kim, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 514 days.

(21) Appl. No.: 10/251,159

(22) Filed: Sep. 20, 2002

(65) Prior Publication Data

US 2003/0139175 A1 Jul. 24, 2003
US 2008/0233942 A9 Sep. 25, 2008

(30) Foreign Application Priority Data

Jan. 20, 2001 (KR) ................................. 2001-3409
Jul. 19, 2001 (KR) ................................ 2001-43465

(51) Int. Cl.
*H04M 3/00* (2006.01)

(52) U.S. Cl. ..................... 455/418; 455/419; 455/420; 455/466; 455/425

(58) Field of Classification Search ......... 455/418–420, 455/466, 352, 353, 70, 68, 517, 566, 414.1, 455/414.3
See application file for complete search history.

(56) References Cited

U.S. PATENT DOCUMENTS

| | | | |
|---|---|---|---|
| 5,046,082 A | 9/1991 | Zicker et al. | |
| 5,603,084 A | 2/1997 | Henry, Jr. et al. | |
| 5,754,830 A | 5/1998 | Butts et al. | |
| 5,920,826 A * | 7/1999 | Metso et al. | 455/557 |
| 6,104,924 A | 8/2000 | Shirai | |
| 6,212,408 B1 * | 4/2001 | Son et al. | 455/563 |
| 6,301,484 B1 * | 10/2001 | Rogers et al. | 455/466 |
| 6,356,543 B2 * | 3/2002 | Hall et al. | 370/352 |
| 6,400,958 B1 * | 6/2002 | Isomursu et al. | 455/466 |
| 6,622,018 B1 * | 9/2003 | Erekson | 455/420 |
| 2001/0006891 A1 * | 7/2001 | Cho | 455/425 |
| 2002/0068557 A1 * | 6/2002 | Heo | 455/422 |
| 2005/0090239 A1 * | 4/2005 | Lee et al. | 455/418 |

FOREIGN PATENT DOCUMENTS

| | | |
|---|---|---|
| GB | 2 328 843 | 3/1999 |
| KR | 1020020096686 | 12/2002 |
| WO | WO 00/65774 | 11/2000 |

* cited by examiner

*Primary Examiner*—Vincent P. Harper
*Assistant Examiner*—Fred A Casca
(74) *Attorney, Agent, or Firm*—The Farrell Law Firm, PC

(57) ABSTRACT

Disclosed is a system for remotely controlling a mobile terminal in a mobile communication system. The mobile terminal receives a control command through a call link and performs an operation according to the received control command. An Internet service provider including a remote control emulator transmits a mobile terminal remote control command to the mobile terminal through the call link, upon receipt of the mobile terminal remote control command through a user interface of the remote control emulator.

13 Claims, 20 Drawing Sheets

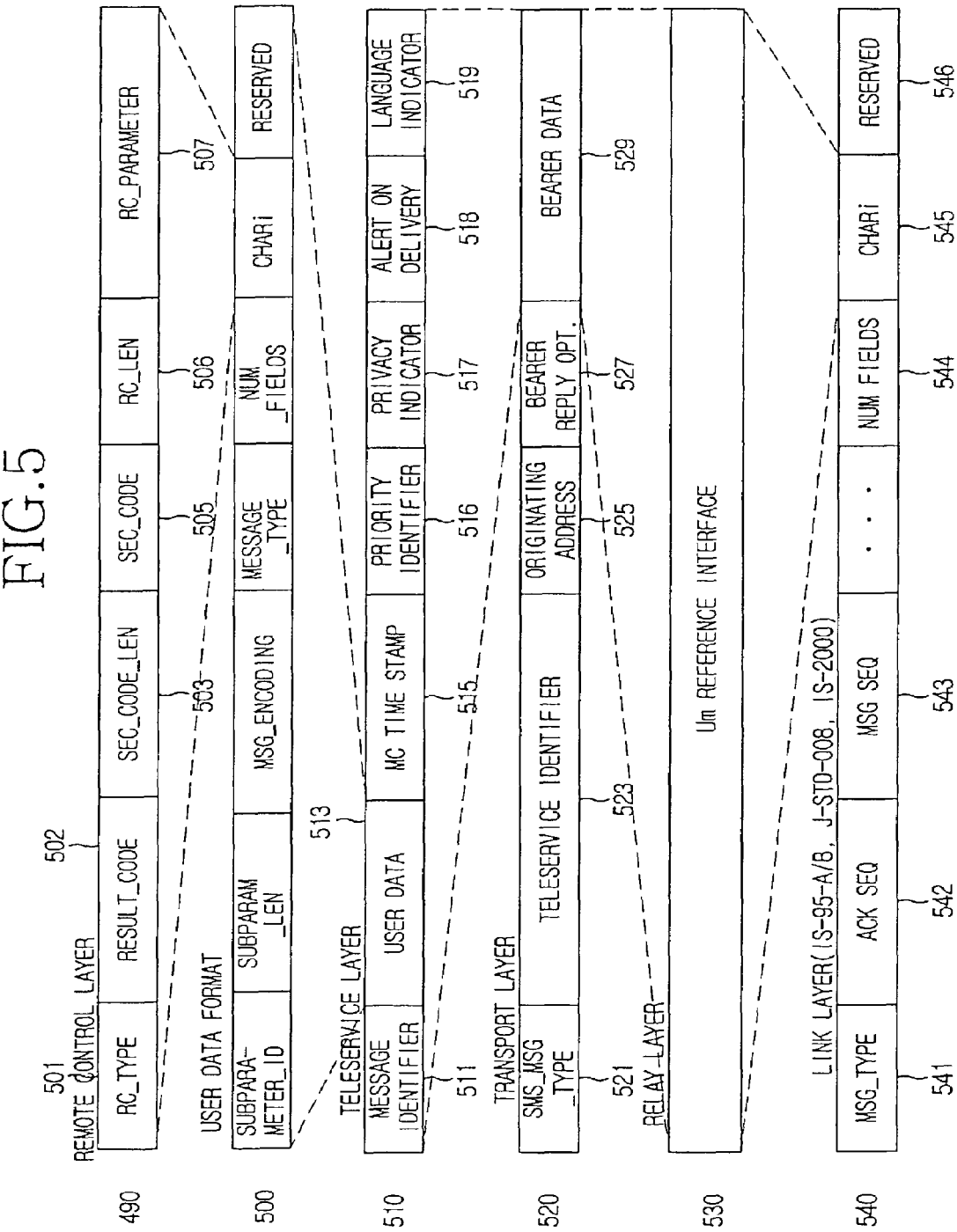

| RC_TYPE | SMS USER DATA |
|---|---|

FIG.6A

| RC_TYPE | RESULT_CODE | SEC_CODE_LEN | SEC_CODE | RC_LEN | RC_PARAMETER |
|---|---|---|---|---|---|

FIG.6B

```
PHONE MANAGEMENT MENU

1: POWER OFF
2: LOCKING
3: EMERGENCY CALL
```

FIG.10C

```
LOCKED
```

FIG.10D

SYSTEM AND METHOD FOR REMOTELY CONTROLLING A MOBILE TERMINAL

This application is a continuation of International Application PCT/KR 02/00085, filed in the International Bureau of WIPO on Jan. 18, 2002, which claims priority to Korean Patent Application filed Jan. 20, 2001 and assigned serial number 2001/3409 and Korean Patent Application filed Jul. 19, 2001 and assigned serial number 2001/43465.

BACKGROUND OF THE INVENTION

1. Field of the Invention

The present invention relates generally to a system and method for controlling a mobile terminal in a mobile communication system, and in particular, to a system and Method for remotely controlling a mobile terminal.

2. Description of the Related Art

In general, a mobile communication system provides a short message service (SMS) in which a user and transmit/receive a short message comprised of characters and numbers through a mobile terminal (or mobile station (MS)). A length of the message is restricted by system constraints. The SMS uses a data burst message based on a mobile communication protocol such as IS-95A, J-STD-008, IS-95B and 15-2000.

FIG. 1 illustrates a conventional network configuration for providing a short message service. Referring to FIG. 1, a BSC/BTS (Base Station Controller/Base station Transceiver System) 109 establishes a radio link to a mobile terminal (or mobile station (MS)) 111 within its service area (or coverage), and exchanges voice and data with the mobile terminal 111. Although the base station controller (BSC) generally controls a plurality of base stations, FIG. 1 shows that the base station controller controls only two base stations, for simplicity. In the following description, the BSC/BTS will be referred to as a "base station (BS)" for short. The base station 109 is connected to a mobile switching center (MSC) 107 connected to a public switched telephone network (PSTN) 113. The MSC 107 includes a visitor location register (VLR), and though not illustrated, is also connected to other MSCs. A home location register (HLR) 105 has subscriber authentication information and location information of the mobile terminals. A message center (MC) 103 provides additional services such as a voice mail service and the SMS service. Although the MC 103 is connected to the single MSC 107 in FIG. 1, it can also be connected to a plurality of MSCs. An SMS server 101 stores SMS messages to be transmitted to the mobile terminals. When there is an SMS message to be transmitted to the mobile terminal 111 or 117, the MC 103 either transmits the SMS message to the mobile terminal 111 through the HLR 105, or detects a location of the mobile terminal 117 and then transmits the SMS message along with an MAP (Mobile Application Part) message to the MSC 107 connected to the corresponding mobile terminal 117. The MSC 107 then transmits the SMS message to the mobile terminal 117 through the corresponding base station 115.

The mobile terminals should have an algorithm, called an "SMS message task", for transmitting/receiving the SMS messages, and also have a specific key for accessing the SMS service in order to read a received SMS message or transmit an SMS message, and an icon indicating arrival of an SMS message. The SMS message task is commonly performed in association with an EEPROM (Electrically Erasable and Programmable Read Only Memory) database task for managing storage and deletion of data, and a diagnostic monitor task. Commonly, a search task is awakened (or activated) in response to Service Option 6, and then performs a corresponding operation.

FIG. 2 illustrates a structure of an SMS protocol stack among a mobile terminal, a base station and a message center in a general mobile communication system. An SMS message is formed based on an IS-95A, IS-95B, IS-2000 or J-STD-008 data burst message. The data burst message is transmitted over a paging channel and a forward traffic channel in a forward link, and transmitted over an access channel and a reverse traffic channel in a reverse link. During a call, the mobile communication system operates in a multiplex option (or mode) where data transmission is available during a voice call.

As illustrated in FIG. 2, the mobile terminal (BS) and the message center (MC) have the same layers. The layers include SMS teleservice layers (201 and 221), SMS transport layers (203 and 223), SMS relay layers (205 and 225), and link layers (207 and 227). The link layer 207 of the mobile terminal is based on IS-95A, while the link layer 227 of the MC is based on common channel signaling system No. 7. The base station (BS) has a structure for interfacing signals from the mobile terminal and the MC.

The associated layers of the mobile terminal and the MC have the same operations, so only the layers of the mobile terminal will be described for simplicity. As illustrated in FIG. 2, an SMS message is carried by a data burst message through the link layer 207. The relay layer 205 receives a message from the transport layer 203 and transmits the received message to a designated next relay point or a terminal point. Upon failure to transmit the message to the next relay point or the terminal point, the relay layer 205 creates an error indicator and transmits the error indicator to the transport layer 203. Further, the relay layer 205 transmits a received message to the transport layer 203. The relay layer 205 controls connection to the link layer 207 of IS-95A, IS-95B, IS-2000 or J-STD-008 protocol stack, in order to relay the message.

The transport layer 203 forms a terminal point for message exchange between the MC and the mobile terminal, and assembles a message by receiving bearer data from the teleservice layer 201. More specifically, the transport layer 203 assembles a transport layer message by receiving a message parameter from the teleservice layer 201, and transmits the assembled transport layer message to the relay layer 205 using a proper relay layer service primitive. In addition, upon receipt of an ACK (acknowledgment) in reply to the transmitted messages, the transport layer 203 informs the relay layer 205 of receipt of the ACK. However, upon receipt of an error report from the relay layer 205, the transport layer 203 provides the received error information to the teleservice layer 201. Further, the transport layer 203 receives an SMS message from the relay layer 205 and transmits the received SMS message to the teleservice layer 201. If authentication is enabled in the network, the transport layer 203 performs an authentication procedure specified in IS-637.

The SMS teleservice layer 201 supports a fundamental SMS function, using a standard subparameter of an SMS message data parameter from the SMS transport layer 203. When the mobile terminal transmits an SMS user ACK message, the SMS teleservice layer 201 transmits a destination address to the transport layer 203. When the MC has an SMS message to transmit to the mobile terminal and a reply option is set up, the SMS teleservice layer 201 provides this information to the user.

FIG. 3 illustrates a message format of each layer in a general SMS protocol stack. Referring to FIG. 3, a link layer 330 is comprised of a data bust message. The data burst message includes a message type field (MSG_TYPE) 331 indicting a type of the message, an ACK sequence field (ACQ_SEQ) 333, a message sequence field (MSG_SEQ) 335, a number field (NUM) 337, an SMS character field (CHARi) 339, and a reserved field 340. An SMS parameter is encapsulated in the character field 339, and the link layer 330 analyzes the character field 339 and transmits the analysis result to an upper layer.

A transport layer 310 is formed through a relay layer 320 based on the character field (CHARi) 339 of the data burst message serving as the link layer 330, as shown in FIG. 3. A transport layer message is comprised of an SMS message type field 311 indicating a type of the SMS message, a teleservice identifier field 313 indicating a voice mail service or a normal message service, an originating address field 315, a bearer reply option field 317 indicating a reply request, and a bearer data field 319. The bearer data field 319 is composed of a message of a teleservice layer 300. The teleservice layer message is comprised of a message identifier field 301, a user data field 303 filled with the contents of a received message, an MC time stamp field 305 indicating an MC time of the message, a priority indicator field 306, a privacy indicator field 307, an alert or delivery field 308 for alerting arrival of a message, and a language indicator field 309.

However, the mobile terminal supporting the SMS service becomes useless, when it is missing or not carried by the user. A future mobile terminal will store a great amount of important personal information in it. However, the user cannot remotely access the information stored in the mobile terminal. In other words, the user cannot access the information unless he or she carries the mobile terminal. Therefore, there is a demand for a method of remotely controlling the mobile terminal.

SUMMARY OF THE INVENTION

It is, therefore, an object of the present invention to provide a system and method for enabling a user to control a mobile terminal even at a remote place, using available communication media.

It is another object of the present invention to provide a system and method for enabling a user to control a mobile terminal and read information from the mobile terminal through an Internet service provider at a computer remote from the mobile terminal.

It is further another object of the present invention to provide a service capable of mutual remote control between mobile terminals by applying an IS-95A, J-STD-008, IS-95B, IS-2000 or IS-637 mobile communication protocol and mobile terminal software, and provide a system and method for enabling a second mobile terminal to remotely control all of the functions provided by a first mobile terminal, using the service.

To achieve the above and other objects, there is provided a system for remotely controlling a mobile terminal in a mobile communication system. The mobile terminal receives a control command through a call link and performs an operation according to the received control command. An Internet service provider including a remote control emulator transmits a mobile terminal remote control command to the mobile terminal through the call link, upon receipt of the mobile terminal remote control command through a user interface of the remote control emulator. The mobile terminal operates based on an IS-637+ layer structure in which a remote control layer exists on a teleservice layer.

BRIEF DESCRIPTION OF THE DRAWINGS

The above and other objects, features and advantages of the present invention will become more apparent from the following detailed description when taken in conjunction with the accompanying drawings in which:

FIG. 5 illustrates a layer structure of a mobile communication system and a message format of each layer according to an embodiment of the present invention;

FIG. 6A illustrates a format of a user data field of the transport layer, wherein a remote control type field in the remote control message of the mobile terminal is '0001', according to an embodiment of the present invention;

FIG. 6B illustrates a format of the user data field of the transport layer, wherein the remote control type field in the remote control message of the mobile terminal is '0010', according to an embodiment of the present invention;

FIGS. 10A to 10D illustrate states displayed on a screen of the remote control requesting terminal according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 8A:
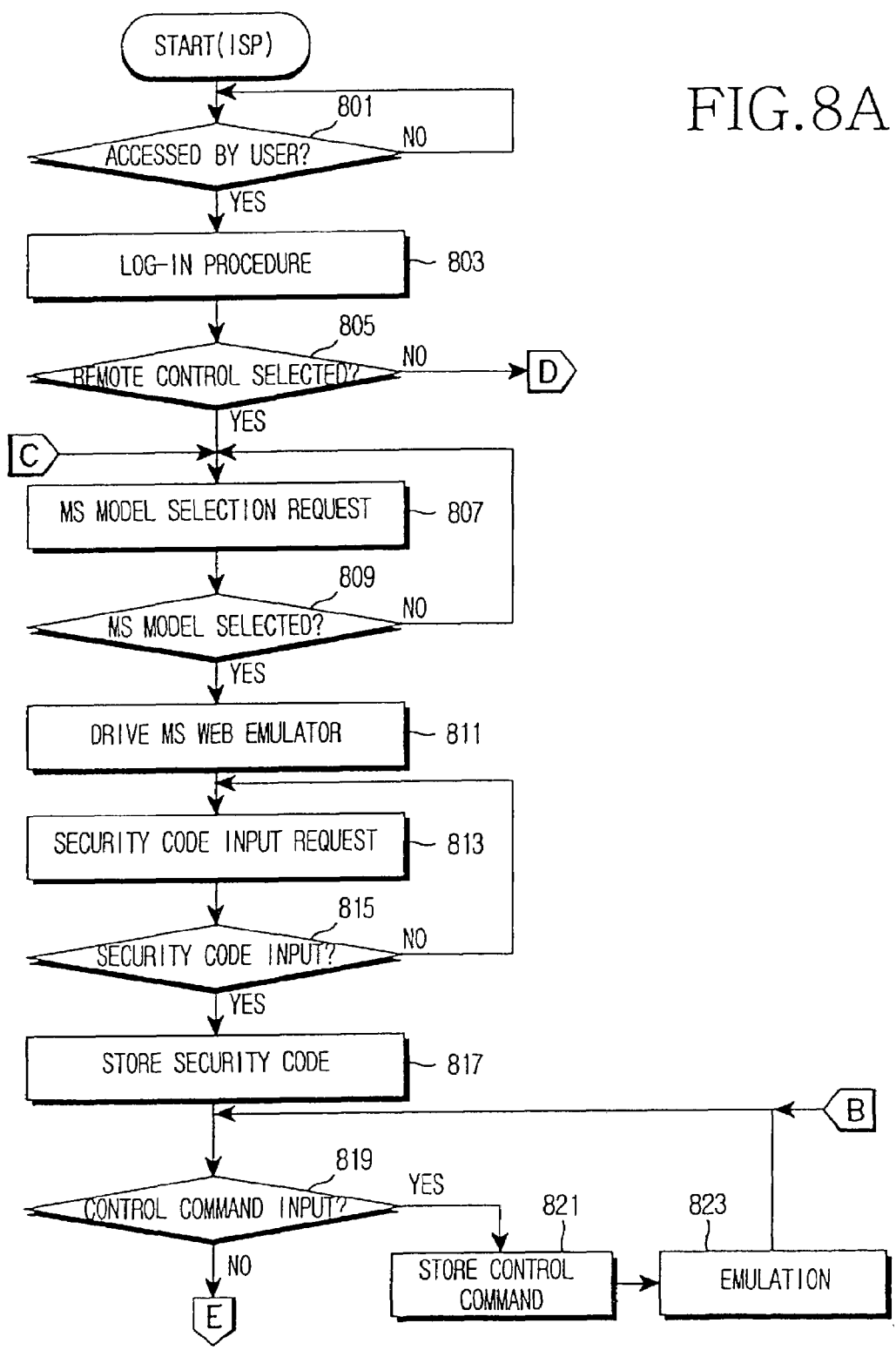
FIGS. 8A and 8B illustrate an operation implemented by the Client_T in a mobile communication system which, remotely controls a mobile terminal through a SMS call on a one-side basis according to an embodiment of the present invention.
Figure 8B:
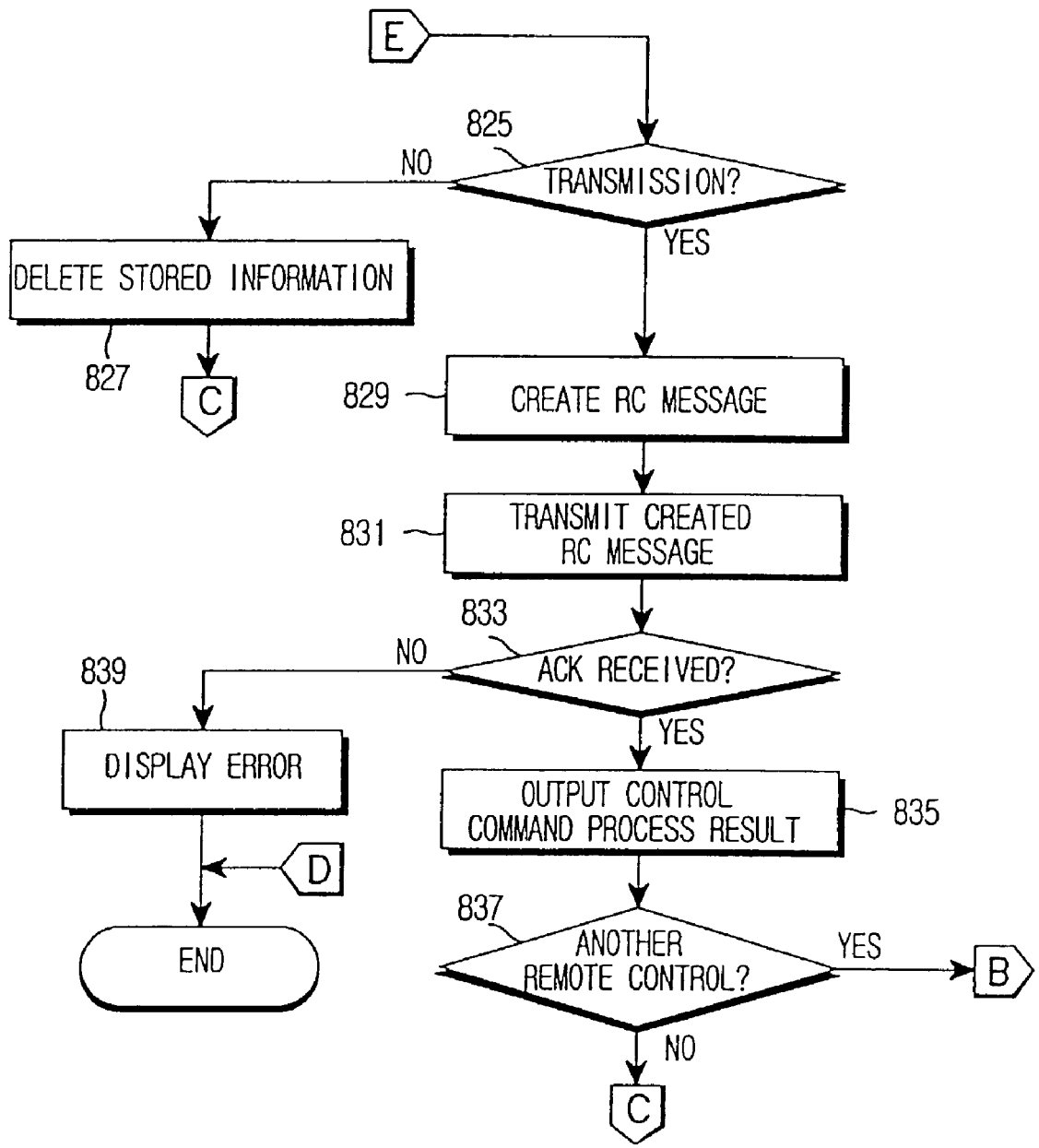
Figure 9:
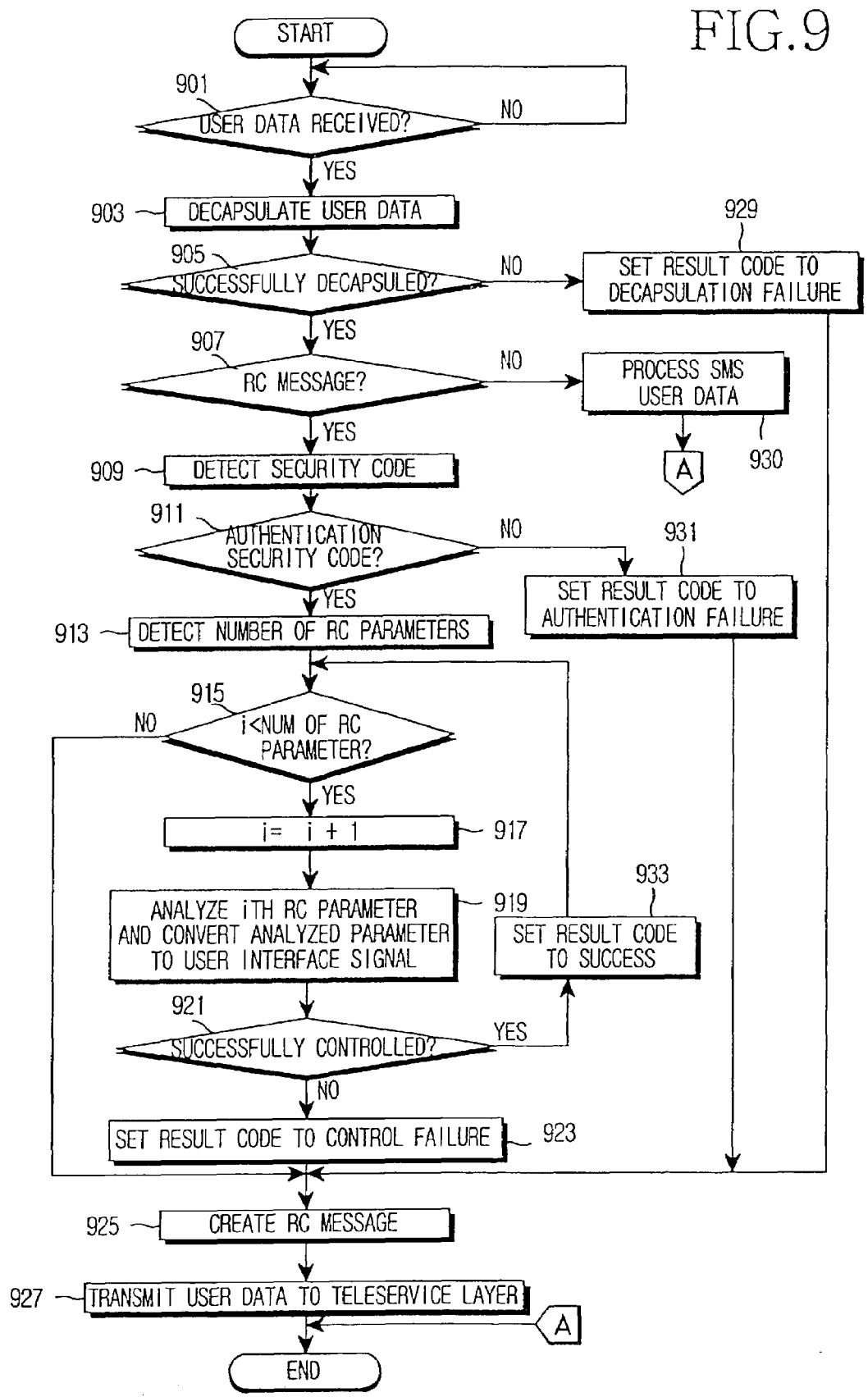
FIG. 9 illustrates an operation performed by the Server_T in a mobile communication system, which remotely controls a mobile terminal through a SMS call on a one-side basis according to an embodiment of the present invention.

Remote control of a mobile terminal according to the present invention is divided into a one-sided type and an interactive type. FIGS. 8A, 8B and 9 show the one-sided remote control, while FIGS. 13 to 16 show the interactive remote control. The remote control of the mobile terminal according to the present invention can be divided into one case where a remote control client terminal (hereinafter, referred to as a "Client_T") is a computer, and another case where the Client_T is a mobile terminal.

Figure 1:
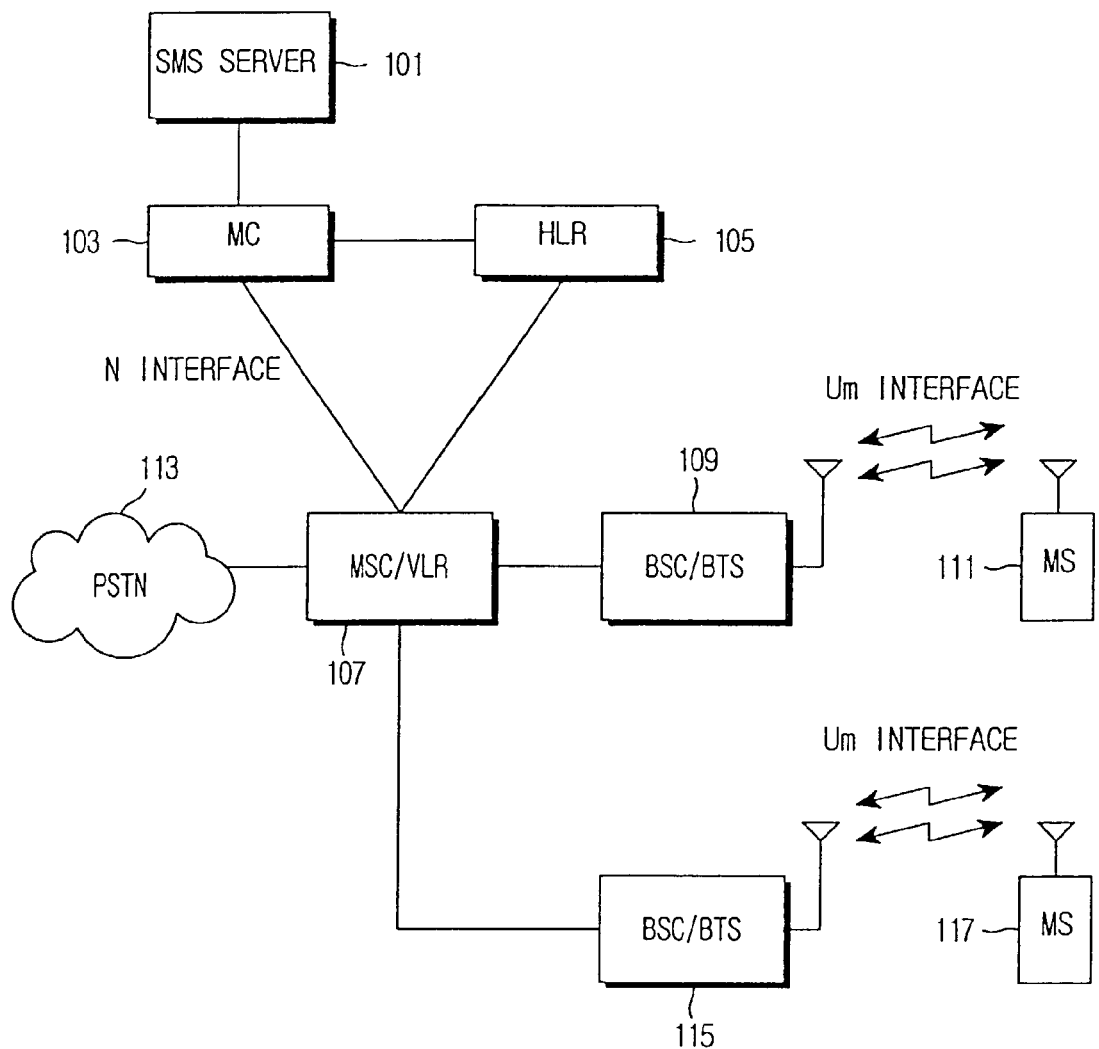
FIG. 1 illustrates a conventional network configuration for providing a short message service.
Figure 2:
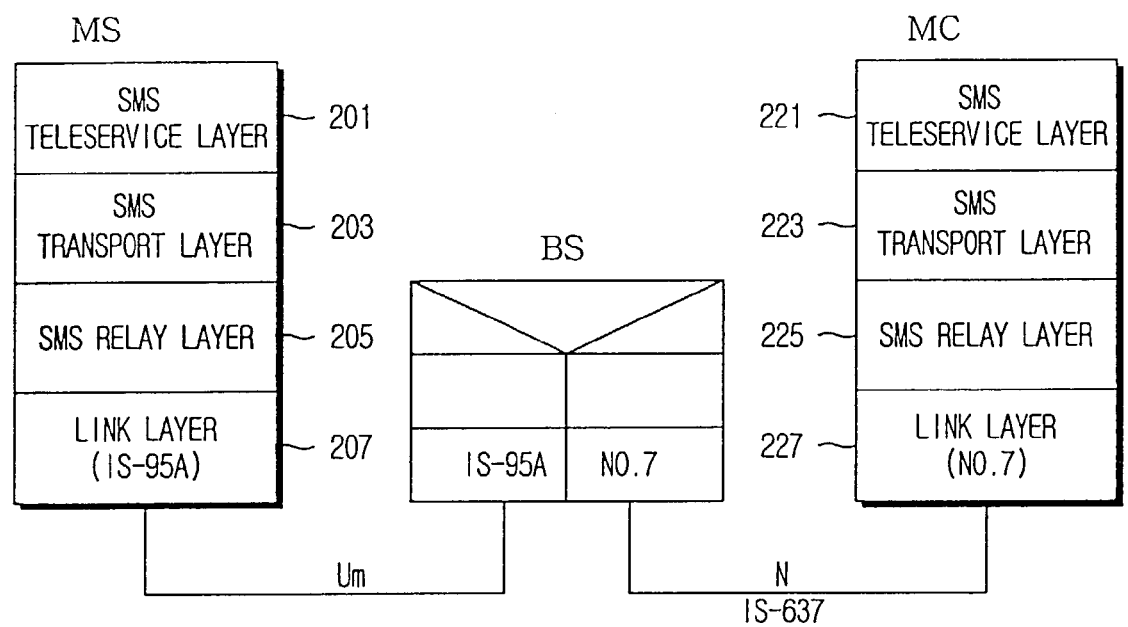
FIG. 2 illustrates a structure of an SMS protocol stack among a mobile terminal, a base station and a message center in a general mobile communication system.

The interactive remote control service defines a communication protocol for enabling interactive exchange of remote control information between different mobile terminals, and then performs remote control between the mobile terminals using the newly defined communication protocol. In order to perform remote control between the mobile terminals using the existing mobile communication protocol such as IS-95A, J-STD-008, IS-95B, IS-2000, IS-637, and Joint Specification for PCS Terminal Manufacturer-SMS function, the network configuration shown FIG. 1 should be modified.

Figure 4:
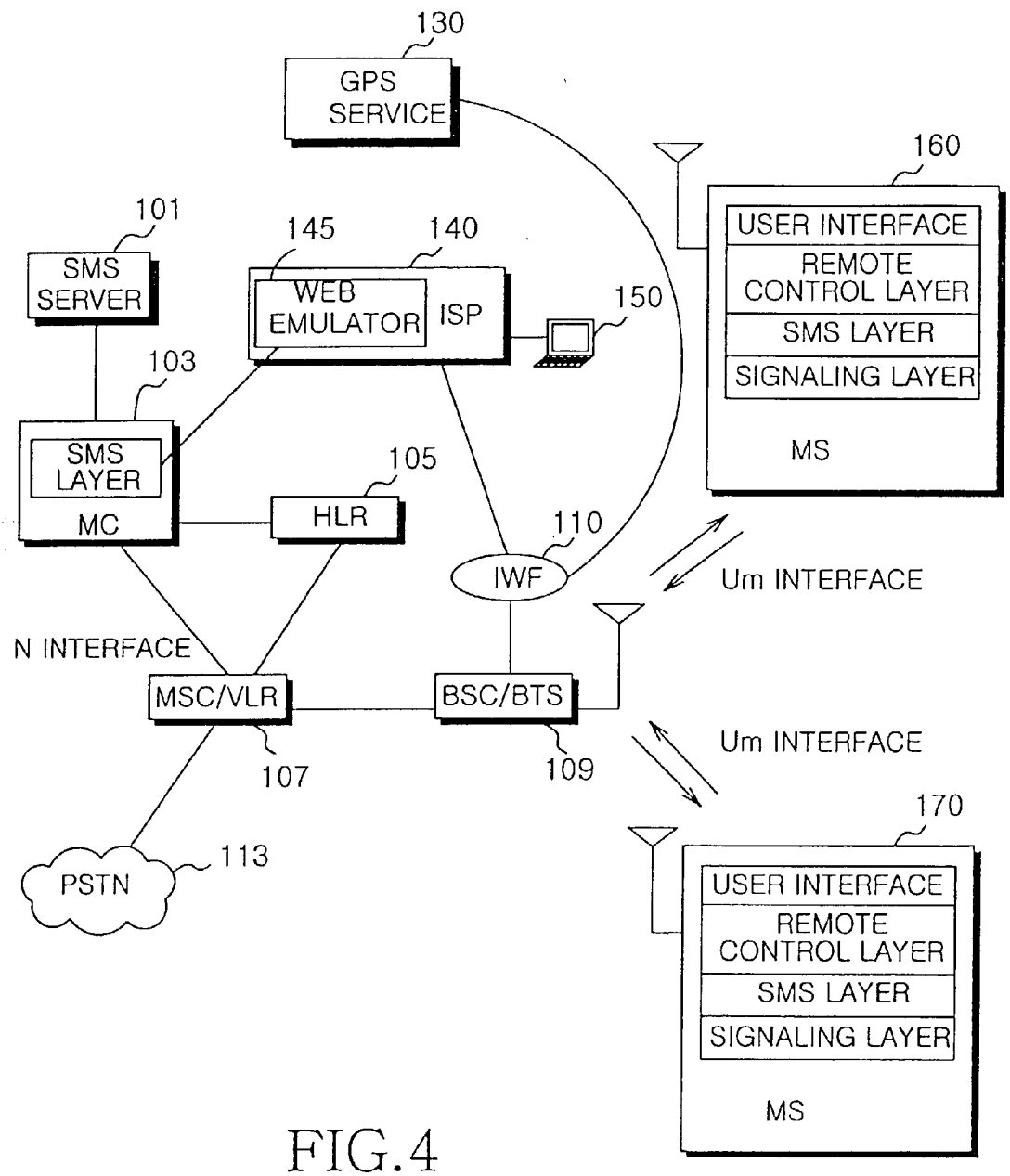
FIG. 4 illustrates a network configuration for providing a remote control service according to an embodiment of the present invention.

FIG. 4 illustrates a network configuration for providing a remote control service according to an embodiment of the present invention. Herein, the invention will be described with reference to the interactive remote control service.

In the following description, "Client_T" represents a remote control requesting terminal. That is, the Client_T means a mobile terminal 160 or a computer 150, which operates in a remote control client mode at a user's request for remote control. Further, "Server_T" represents a remote control serving terminal that receives a remote control service request. That is, the Server_T means a mobile terminal 170, which operates in a remote control server mode upon receiving the remote control service request. For the sake of convenience, the Client_T and the Server_T may have different models. In addition, since the mobile terminal provides a different service according to its model, the Client_T is required to recognize information on the services provided by the Server_T, in order to control the Server_T at a remote place. The Client_T selects a type of service information provided by the Server_T and transmits the selected service information to the Server_T, so that the Server_T is controlled based on the received service information, thus accomplishing the remote control.

If it is assumed that the mobile terminal 160 servers as a Client_T and the mobile terminal 170 serves as a Server_T the system shown in FIG. 4 can remotely control the mobile terminal 170 by accessing a web emulator 145 through the following three different routes.

1) Mobile Terminal 160→BSC/BTS 109→MSC/VLR 107→MC 103→Web Emulator 145 of Internet Service Provider (ISP) 140
2) Mobile Terminal 160→BSC/BTS 109→IWF 110→Web Emulator 145
3) Computer 150→Web Emulator 145

For example, in case 3), if the computer 150 calls the mobile terminal 170 through the web emulator 145 of the Internet service provider 140, the mobile terminal 170 provides its location information to a GPS (Global Positioning System) service center 130 through an IWF (Interworking Function) 110. Then, the GPS service center 130 transmits the location calculation result to the web emulator 145 of the Internet service provider 140 through the IWF 110.

A remote control client mode and a remote control server mode, operation modes of the mobile terminal according to the present invention, will be defined as follows.

The remote control client mode is activated, when the mobile terminal is connected to an interactive remote control teleservice in SMS Service Option (6/14) after initiating a call (MS Initiated Call). At the moment, the mobile terminal serves as a Client_T, displays the remote control results performed on a Server_T on its screen, and transmits user's control information in reply to the remote control results to the Server_T using the interactive remote control teleservice.

The remote control server mode is activated, when the network calls the mobile terminal (N/W Initiated Call), so that the mobile terminal is connected to the interactive remote control teleservice in the SMS Service Option (6/14). At the moment, the mobile terminal serves as a Server_T, and is controlled based on to a request from the Client_T. The Server_T transmits the remote control result to the Client_T using the interactive remote control teleservice, instead of displaying it on its LCD (Liquid Crystal Display).

Here, the "interactive remote control teleservice" refers to a service for transmitting/receiving remote control information among the Client_T, the MC and the Server_T in a traffic state where a service option configuration of the SMS Service Option (6/14) is used. A brief description of the interactive remote control teleservice will be given below.

The interactive remote control teleservice uses the existing SMS Service Option (6/14) for the service option. In addition, the interactive remote control teleservice uses an interactive remote control teleservice identifier REMOTE_CONTROL_TELESERVICE_ID. The Client_T, the MC and the Server_T can trigger an interactive remote control teleservice end procedure, upon failure to receive an ACK until expiration of a specific time period after transmitting SMS submit/deliver messages requesting a user acknowledgement. In another case, however, only the Client_T can trigger the interactive remote control teleservice end procedure.

The follows are protocol requirements for the interactive remote control teleservice according to the present invention.

1) The interactive remote control teleservice ID REMOTE_CONTROL_TELESERVICE_ID shall be newly defined among reserved teleservice IDs of the SMS protocol. The interactive remote control teleservice ID is used to identify an interactive remote control teleservice SMS message among the Client_T the Server_T and the MC. The interactive remote control teleservice ID among the Client_T the Server_T and the MC is handled based on the web emulator requirements, the mobile terminal requirements and the MC requirements.

2) A remote control menu request identifier specification between the Client_T and the Server_T shall be defined. When the Client_T transmits an SMS message by setting (or filling) a CHARi field of a user message subparameter to (or with) the remote control menu request identifier, the Server_T transmits user defined remote control menu information or default remote control menu information.

Mobile Terminal Requirements for Interactive Remote Control Teleservice

1) The mobile terminal supports a separate remote control mode. The remote control mode is divided into a remote control client mode and a remote control server mode. Fundamentally, the mobile terminal shall be able to operate in both the remote control client mode and the remote control server mode.

2) When the mobile terminal serves as a Server_T, the mobile terminal shall be able to register in a remote control menu so that the user can perform the remote control. Therefore, the mobile terminal may provide a user interface. The user interface for registering the remote control menu is optional. When the user interface for registering the remote control menu is not provided, the mobile terminal with the interactive remote control function may use a default menu set by the manufacturer.

3) The mobile terminal has an additional function of handling an interactive remote control teleservice ID for an SMS protocol layer.

When the teleservice ID is REMOTE_CONTROL_TELESERVICE_ID, the mobile terminal shall be able to transmit/receive a CHARi field of the user message subparameter to/from a remote control application (program).

In the remote control mode, the mote terminal shall manage SESSION_SEQ in the following order:

a) When the remote control mode is activated, the mobile terminal initializes SESSION_SEQr and SESSION_SEQs to 0×FF.

b) Upon receipt of an SMS deliver message from the MC while SESSION_SEQs is 0×FF, the mobile terminal stores [(SESSION_SEQr+2) modulo 8] as SESSION_SEQs.

c) Upon receipt of an SMS deliver message from the MC while SESSION_SEQs is not 0×FF, the mobile terminal processes the SMS deliver message if the SESSION_SEQr is identical to the SESSION_SEQs. Otherwise, if the SESSION_SEQr is not identical to the SESSION_SEQs, the mobile terminal does not process the MSS deliver message. Here, the SESSION_SEQr represents SESSION_SEQ of the SMS deliver message received from the MC, while SESSION_SEQs represents SESSIO_SEQ managed in the SMS protocol layer of the mobile terminal in the remote control mode.

Upon receipt of an SMS deliver message with an END_OF_SESSION field set to '1' while the teleservice ID field is set to REMOTE_CONTROL_TELESERVICE_ID, the mobile terminal shall transmit a remote control end request to the remote control application.

Operation of Remote Control Application

When the remote control application is in the remote control client mode, the mobile terminal (or Client_T) operates as follows:

a) Upon receipt of a remote control client mode activation request from the user interface, the mobile terminal activates the remote control client mode.

b) The mobile terminal transmits information transmitted from the Server_T to the user interface.

c) The mobile terminal sets (fills) the CHARi field of the user message subparameter of the teleservice layer to (with) information selected by the user, and the teleservice ID field to REMOTE_CONTROL_TELESERVICE_ID, and then transmits them to the SMS protocol stack.

When the remote control application is in the remote control server mode, the mobile terminal (or Server_T) operates as follows:

a) Upon receipt of a remote control server mode activation request from the SMS protocol stack, the mobile terminal activates the remote control server mode.

b) Upon receipt of a remote control menu request while the remote control server mode is activated, the mobile terminal sends a remote control server mode activation request to the user interface by setting the CHARi field of the user message subparameter to the remote control menu request.

c) The mobile terminal generates an event defined by the user interface of the Server_T based on the control information selected by the Client_T, and then awaits an ACK from the user interface.

d) Upon receipt of an ACK from the user interface, the mobile terminal sets the CHARi field of the user message subparameter of the teleservice layer to the remote control process result and the teleservice ID field to the REMOTE_CONTROL_TELESERVICE_ID, and then transmits them to the SMS protocol stack.

e) Upon receipt of an interactive remote control teleservice end request from the SMS protocol layer, the mobile terminal ends the interactive remote control teleservice according to an interactive remote control teleservice end procedure.

f) The mobile terminal operating in the remote server mode cannot request an end of the interactive remote control teleservice. However, it is exceptional when the mobile terminal fails to receive an interactive remote control message for a prescribed time.

User Interface Requirements

1) Upon receipt of a remote control client mode activation request from the remote control application, the user interface activates the remote control client mode.

2) Upon receipt of a remote control server mode activation request with the CHARi field of the user message subparameter set to the remote control menu request from the remote control application, the user interface activates the remote control server mode and then transmits the remote control menu to the remote control application.

3) When the remote control client mode is activated, the user interface shall display the CHARi of the received user message subparameter on the LCD according to the reply type and method (see Joint Specification for PCS Terminal Manufacturer-SMS function), limit a type of the user ACK, and transmit the user ACK to the remote control application.

4) When the mote control server mode is activated, the user interface transmits the remote control process result to the remote control application by setting the CHARi field of the user message subparameter based on the reply type and method (see Joint Specification for PCS Terminal Manufacturer-SMS function), instead of displaying the result performed on the event generated in the current state of the user interface.

MC Requirements

1) * and + service number process

The MC recognizes an SMS origination message with a destination address beginning with '*' as an interactive teleservice and provides a consistent user interface to the Client_T until the SESSION is ended by the user or the network, and also provides a consistent user interface to the subscriber (or Server_T) until the session is ended by the user or the network, based on the service number.

When the teleservice ID is REMOTE_CONTROL_TELESERVICE_ID, the transport layer of the MC shall provide SMS message exchange service between the mobile terminals using the origination and destination addresses.

2) REMOTE_CONTROL_TELESERVICE_ID handling requirements

When the teleservice ID is REMOTE_CONTROL_TELESERVICE_ID, the MC shall create a unique value S as SESSION_ID and guarantee independency of the interactive remote control teleservice session by assigning the created unique value to the Client_T and the Server_T.

When the teleservice ID is REMOTE_COTNROL_TE-LESERVICE_ID, the MC shall manage SESSION_SEQ in the following order.

a) Upon receipt of an SMS origination message with a destination address beginning with '*', the MC shall initialize SESSION_SEQr and SESSION_SEQs to 0×00 and set SESSION_SEQ of the SMS deliver message to SESSION_SEQr.

b) Upon receipt of an SMS submit message, the MC shall set SESSION_SEQ of the SMS submit message to SESSION_SEQr and store [(SESSION SEQr+1) modulo 8] as SESSION_SEQs.

c) To transmit an SMS deliver message, the MC sets the SESSION_SEQ of the SMS deliver message to SESSION_SEQs. Here, SESSION_SEQr represents SESSION_SEQ received with the SMS submit message, while SESSION_SEQs represents SESSION_SEQ managed in the SMS protocol layer of the MC in the interactive remote control teleservice.

The MC should be able to connect the Client_T to the Server_T on a point-to-point basis during the remote control teleservice session, based on the origination address and the termination address in an SMS point-to-point message parameter.

Network Requirements

1) The network shall provide an interactive remote control teleservice registration procedure.

The network shall provide an operating procedure registerable in it, in order that all the mobile terminals with the interactive remote control teleservice function can be provided with the interactive remote control teleservice. For example, the interactive remote control teleservice registration procedure can use a method similar to a network registration procedure for a wait-during-call function. When the user presses SEND button after selecting a combination of specified keys, the network shall provide the remote control teleservice to the user, recognizing that the user desires to be provided with the remote control teleservice.

2) When the user does not register the interactive remote control teleservice, the network should be able to prevent it from connecting the remote control service to the mobile terminal with no remote control teleservice function.

A detailed procedure for the network requirements will not be described herein, for simplicity. The MS web emulator requirements should be able to support all the contents corresponding to the Client_T among the mobile terminal requirements and the user interface requirements.

Figure 3:
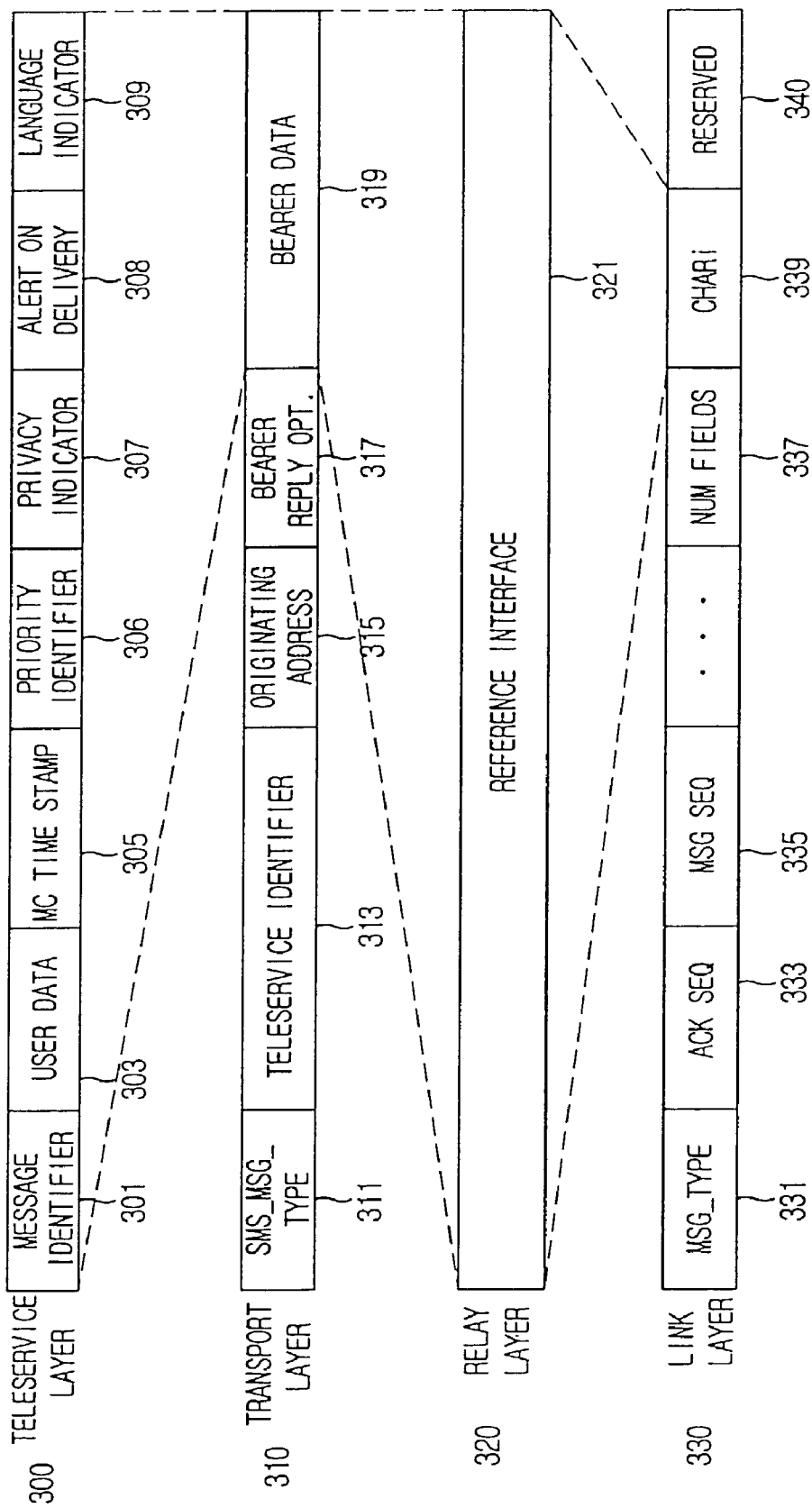
FIG. 3 illustrates a layer structure of a general mobile communication system and a message format of each layer.

FIG. 5 illustrates a layer structure of a mobile communication system and a message format of each layer according to an embodiment of the present invention. The illustrated layer structure is featured in that a remote control layer 490 exists on the teleservice layer 510 of the IS-637 layer structure shown in FIG. 3. Accordingly, the illustrated layer structure will be called an "IS-637+ layer structure". The remote control layer 490 includes a remote control type field (RC_TYPE) 501, a result code field (RESULT_CODE) 502, a security code length field (SEC_CODE_LEN) 503, a security code field (SEC_CODE) 505, a remote control parameter length field (RC_LEN) 506, and a remote control information parameter field (RC_PARAMETER) 507. In addition, the remote control layer 490 can further include a supplemental field length field and a supplemental field.

Shown in Tables 1 to 9 are the types and field structure of transport layer and remote control layer messages according to an embodiment of the present invention. Specifically, Tables 1 to 6 show the type and field structure defined in 3.4 Transport Layer Message of IS-637A, and Tables 7 to 9 show the type and field structure of the remote control layer newly defined according to an embodiment of the present invention.

Table 1 shows the type of the transport layer message defined by Table 3.4-1 SMS Transport Layer Message of IS-637. According to Table 1, the current message type MESSAGE_TYPE includes an SMS Point-to-Point message, an SMS Broadcast message and an SMS Acknowledge message.

TABLE 1

| Message Type | BS→MS | MS→BS | SMS_MSG_TYPE Code |
|---|---|---|---|
| SMS Point-to-Point | X | X | 00000000 |
| SMS Broadcast | X | | 00000001 |
| SMS Acknowledge | X | X | 00000010 |
| | | Reserved | |

Tables 2A and 2B show a detailed format of a transport layer message defined by 3.4.1 Message Format of IS-637A. The transport layer message is comprised of one SMS_MSG_TYPE field of Table. 2A and at least one record (PARAMETER_ID field, PARAMETER_LEN field, and Parameter DATA field) of Table 2B.

TABLE 2A

| Field | Length (bits) |
|---|---|
| SMS_MSG_TYPE | 8 |

TABLE 2B

| Field | Length (bits) | Description |
|---|---|---|
| PARAMETER_ID | 8 | This field shall be set to the number of octets in the SMS MSG parameter, not including the PARAMETER_ID and PARAMETER_LEN field |
| PARAMETER_LEN | 8 | |
| Parameter Data | 8 × PARAMETER_LEN | |

Table 3 shows a message format defined by Table 3.4.2.1-1 SMS Point-to-Point Message Parameters of 3.4.3 Message Definition of IS-637A. Although bearer data is operational in realizing the transport layer, the bearer data, when it is used for the one-sided remote control, shall be newly defined as shown Table 5.

TABLE 3

| Parameter | Type |
|---|---|
| Teleservice Identifier | Mandatory |
| Originating Address | Mobile-Terminated Messages: not present |
| | Mobile-Originated Messages: Mandatory |
| Originating Subaddress | Optional |
| Destination Address | Mobile-Terminated Messages: not present |
| | Mobile-Originated Messages: Mandatory |
| Destination Subaddress | Optional |
| Bearer Reply Option | Optional |
| Bearer Data | Optional |

Table 4 shows a message format defined by Table 3.4.3-1 Parameter Identifiers in 3.4.3 Parameter Definitions of IS-637A.

TABLE 4

| Parameter | PARAMETER_ID Value |
| --- | --- |
| Teleservice Identifier | 00000000 |
| Broadcast Service Category | 00000001 |
| Origination Address | 00000010 |
| Originating Subaddress | 00000011 |
| Destination Address | 00000100 |
| Destination Subaddress | 00000101 |
| Bearer Reply Option | 00000110 |
| Cause Codes | 00000111 |
| Bearer Data | 00001000 |
| All other values are reserved | |

Table 5 shows a message format defined by 3.4.3.1 Teleservice Identifier of IS-637A, and according to Table 4, PARAMETER_ID of the Teleservice ID is '00000000'.

TABLE 5

| Field | Length (bits) | Description |
| --- | --- | --- |
| PARAMETER_ID | 8 | 00000000 |
| PARAMETER_LEN | 8 | 00000010 |
| IDENTIFIER | 16 | This field shall be set to the value corresponding to the Teleservice, as defined in the SMS_TELESERVICE Identifier Values Table in IS-41_C |

Table 6 shows a message format of a sub ID of the Teleservice ID of FIG. 5, defined by 3.4.3.1-1. TIA/EIA-41-D Supported Teleservices of IS-637A. As shown, there are several previously defined Teleservices. Likewise, it is possible to implement remote control of the mobile terminal according to the present invention by defining the remote control teleservice in the reversed field.

TABLE 6

| IS-637 Teleservice | IS-41 Teleservice | Value |
| --- | --- | --- |
| IS-91 Extended Protocol Enhanced Services | CMT-91 | |
| Cellular Paging Teleservice | CPT-95 | 4097 |
| Cellular Messaging Teleservice | CMT-95 | 4098 |
| Voice Mail Notification | VMN-95 | 4099 |

Table 7 defines the remote control type field TC_TYPE for the remote control message of the mobile terminal according to an embodiment of the present invention.

TABLE 7

| Parameter | PARAMETER_ID Value |
| --- | --- |
| Teleservice Identifier | 00000000 |
| Broadcast Service Category | 00000001 |
| Origination Address | 00000010 |
| Originating Subaddress | 00000011 |
| Destination Address | 00000100 |
| Destination Subaddress | 00000101 |
| Bearer Reply Option | 00000110 |
| Cause Codes | 00000111 |
| Bearer Data | 00001000 |
| All other values are reserved | |

FIG. 6A illustrates a format of a user data field of the transport layer, wherein a remote control type field RC_TYPE in the remote control message of the mobile terminal is '0001', according to an embodiment of the present invention. FIG. 6B illustrates a format of the user data field of the transport layer, wherein the remote control type field in the remote control message of the mobile terminal is '0010', according to an embodiment of the present invention.

Table 8 shows a detailed format of the user data field of the transport layer wherein a remote control type field in the remote control message of the mobile terminal is filled with '0010', according to an embodiment of the present invention.

TABLE 8

| Field | Length | Description |
| --- | --- | --- |
| RESULT_CODE | 8 | Remote control process result state information of the mobile terminal. If RESULT_CODE is not successful, Internet web emulator provides error information to user without performing the remaining fields. |
| SEC_CODE_LEN | 8 | Length of SECURITY_CODE (unit: octet) |
| SEC_CODE | 8 × SECURITY_CODE_LEN | Indicate whether it is possible to perform remote control access to mobile terminal |
| RC_LEN | 8 | Length of RC_PARAMETER (unit: octet) |
| RC_PARAMETER | 8 × RC_LEN | Remote control information of mobile terminal. In the case of MT (Mobile Termination), event information generated in Internet web mobile terminal is set in a unit of 8 bits. In the case of MO (Mobile Origination), it represents remote control process result information for mobile terminal |

In Table 8, RESULT_CODE represents remote control process result state information of the mobile terminal. If the RESULT_CODE is not SUCCESS, the Internet web emulator provides error information to the user without performing the remaining fields. SEC_CODE_LEN represents a length of SECURITY_CODE in octet, and SEC_CODE indicates whether it is possible to perform remote control access to the mobile terminal. RC_LEN represents a length of RC-PARAMETER in octet. RC_PARAMETER represents remote control information for the mobile terminal. In the case of MT (Mobile Termination), event information generated in a mobile terminal emulator of the Internet web is set in a unit of 8 bits. In the case of MO (Mobile Origination), the RC_PARAMETER represents information on the remote control process result for the mobile terminal.

Table 9 shows usage of the RESULT_CODE of Table 8. For example, if a remote control command is a power-off command, the Server_T turns off power and sets the RESULT_CODE to '00000000' while sending a rely to the Client_T. Unlike other control commands (e.g., phone number search command), the reply message is not required to include the RC_PARAMETER field. This is because the Server_T is simply required to turn off power.

TABLE 9

| RESULT_COD | Description |
|---|---|
| 00000000 | Success |
| 00000001 | Failure—access item not found |
| 00000010 | Failure—security code disagreed |
| 00000011 | Failure—no reply from mobile terminal |
| | All other values are reserved. |

Figure 7:
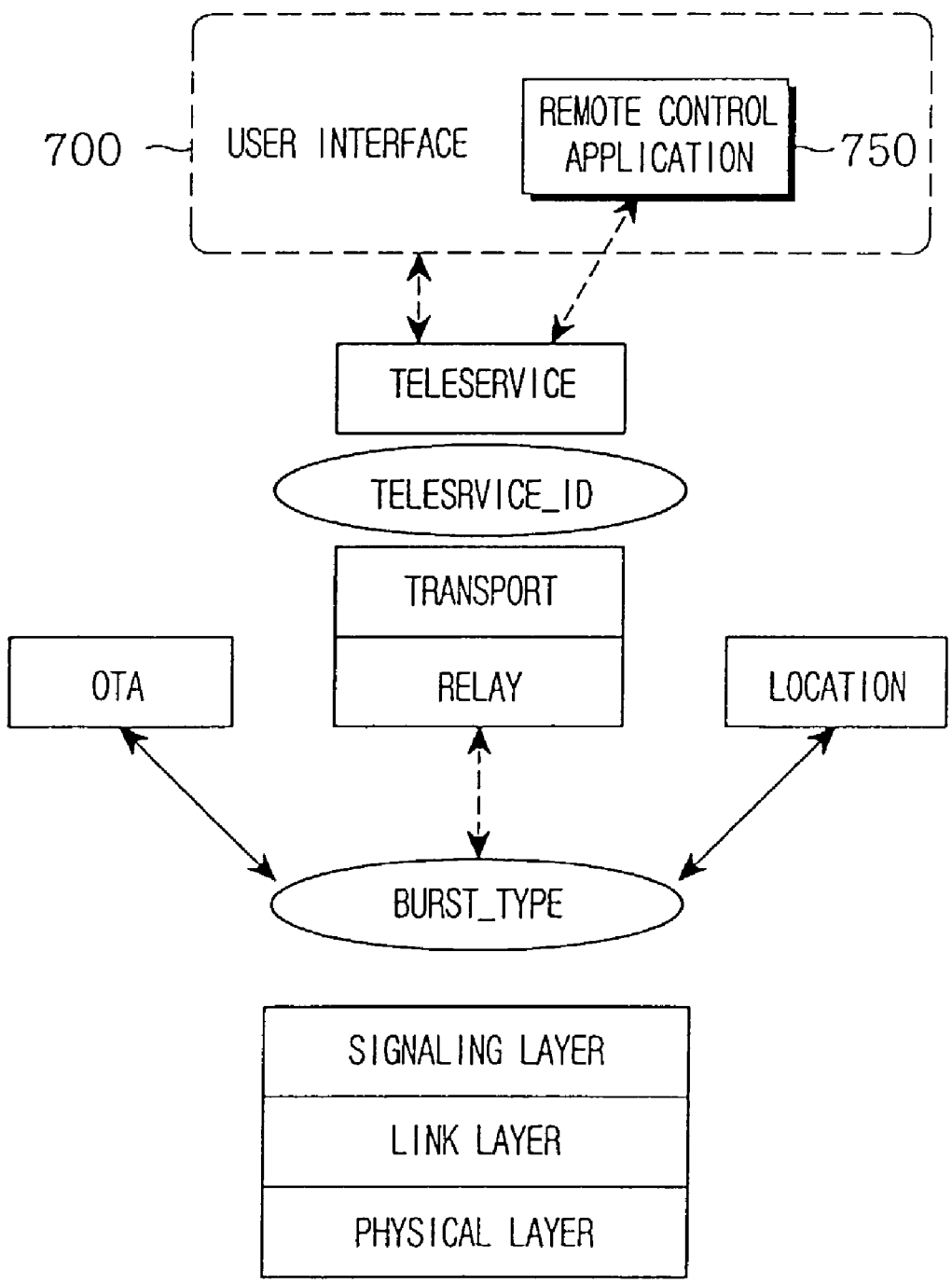
FIG. 7 illustrates a configuration of a remote control software program executed by a remote control application of the mobile terminal according to an embodiment of the present invention.

FIG. 7 illustrates a configuration of a remote control software program executed by a remote control application of the mobile terminal serving as a Client_T or a Server_T, according to an embodiment of the present invention. Referring to FIG. 7, a remote control application 750 converts a remote control command received from the Client_T or the remote control process result to be transmitted by the Server_T to a user interface signal of the mobile terminal. For example, if the Client_T (e.g., mobile terminal 160 or computer 150) transmits a remote control command to input a numeric key '1'. The Server_T (e.g., motile terminal 170) then analyzes the remote control command and generates a user interface signal as if a numeric key '1' is directly input thereto. A main controller (not shown) of the mobile terminal 170 performs a unique process for input of the numeric key '1', and the process result is provided to the remote control application 750, so that the remote control process result can be reported to the Client_T. That is, the remote control application 750 triggers the user interface 700 so as to perform such process. A detailed description of the process will be made with reference to FIGS. 9 to 12.

FIGS. 8A and 8B illustrate an operation implemented by the Client_T in a mobile communication system which, remotely controls a mobile terminal through a SMS call on a one-side basis according to an embodiment of the present invention.

Referring to FIG. 8A, a user of the mobile terminal 160 accesses the Internet service provider (ISP) 140 through the computer 150. The ISP 140 determines in step 801 whether it is accessed by a specific user. If a specific user attempts to access it, the ISP 140 performs a log-in procedure in step 803. The log-in procedure is performed for user authentication and to inform the user of the process result on a specific operation. If the log-in is failed, the step 801 is repeatedly performed. In the meantime, if the log-in is succeeded, it is determined in step 805 whether remote control for the mobile terminal is selected. The step 805 can be skipped, if the ISP 140 has only a remote control emulator for the mobile terminal. In this case, if the log-in is succeeded in the log-in procedure of step 803, the ISP 140 directly proceeds to step 807. If the log-in is succeed in step 803 or if the MS (mobile terminal) remote control emulator is selected in step 805, the ISP 140 requests the user to select a model, i.e., a type of the mobile terminal in step 807. This is because the mobile terminals may have different user interfaces. The ISP 140 determines in step 809 whether a model of the mobile terminal is selected by the user. If the user has selected a model of the mobile terminal, the ISP 140 drives (or runs) an MS remote control web emulator in step 811. If the MS remote control web emulator is driven, the ISP 140 requests the user to input a security code in step 813. The security code should be identical to a security code previously set in the mobile terminal 160 by the user. After the security code request, the IPS 140 determines in step 815 whether a security code is input by the user. Upon receipt of a security code, the ISP 140 stores the received security code in step 817, and then performs a remote control operation requested by the user. The user will select a key or a menu indicating an intended function displayed on a monitor of the computer 150, using a user interface of the mobile terminal 160.

The ISP 140 recognizes the remote control command, input by the user, from the computer 150 in step 819, and stores the remote control command in step 821. Thereafter, in step 823, the ISP 140 performs an emula remote control command and then returns to step 819. Referring also now to FIG. 8B, if no more remote control command is received in step 819, the SP 140 requests in step 825 the user to determine whether to transmit a remote control message for controlling the mobile terminal 170 and then determines whether the user determines to transmit the remote control message. If the user determines the transmission, the ISP 140 creates and RC message including the stored RC types, security code, length of control information and the control information in step 829, and then transmits the created RC message in step 831.After transmitting the RC message, the ISP 140 determined in step 833 whether an ACK message is received in reply to the transmitted message. If an ACK message is not received for a prescribed time period RC_TYPE is no '0010', or a result code of the received remote control message is not '00000000' (i.e., not successful), the ISP 140 displays an error on the web emulator in step 839. Then, the user can recognize occurrence of an error at the sight of the information displayed in the computer 150.

However, upon receipt of an ACK message in reply to the transmitted message in step 833, the ISP 140 provides the control command process result to the computer 150 in step 835. Thereafter, the ISP 140 determines in step 837 whether to perform another remote control operation by checking a key input by the user. If it is determined to perform another remote control operation, the ISP 140 returns to step 819, and otherwise, returns to step 807. Meanwhile, if the user determines not to transmit a remote control message in step 825, the ISP 140 deletes the information stored up to then in step 827, and returns to step 807.

The present invention has been described with reference to an environment where the user accesses the ISP 140 through the computer 150. However, the invention can also be performed through another mobile terminal accessible to the ISP 140.

FIG. 9 illustrates an operation performed by the Server_T in a mobile communication system, which remotely controls a mobile terminal through a SMS call on a one-side basis according to an embodiment of the present invention.

Referring to FIG. 9, the mobile terminal 170 detects user data of the teleservice layer from a received SMS message in step 901, and then detects an RC message by decapsulating the user data in step 903. After decapsulating the user data, the mobile terminal 170 initializes the result code RESULT_CODE to '11111111'. After the decapsulation, the mobile terminal 170 determines in step 905 whether the user data is successfully decapsulated. If the user data is not successfully decapsulated, the mobile terminal 170 sets the result code RESUT_CODE to a value '00000001' indicating decapsulation failure in step 929. In contrast, if the user data is successfully decapsulated, the mobile terminal 170 analyzes the RC_TYPE field indicating the type of the RC message in step 907, to determine whether the user data is an SMS service message or an RC message. If the RC_TYPE field is set to '0001', the user data is an SMS message. Otherwise, if the RC_TYPE field is set to '0010', the user data is an RC message. As the result of the analysis, if the user data is an SMS message, the mobile terminal 170 performs a normal SMS user data processing procedure in step 930. However, if the user data is an RC message, the mobile terminal 170 detects a security code from a security code field of the RC message in step 909. Subsequently, in step 911, the mobile terminal 170 compares the security code detected in step 909 with a security code previously set by the user, to determine whether they are identical, i.e., whether the user intended to perform the remote control is an authenticated user. As the result of the comparison, if the security code detected from the security code field in the RC message is identical to the preset security code, the mobile terminal 170 proceeds to step 913, and otherwise, proceeds to step 931. In step 931, the mobile terminal 170 sets the RESULT_CODE to '00000010' indicating authentication failure. In step 913, the mobile terminal 170 detects a length of the RC parameter from the RC parameter length field RC_LEN of the RC message. The RC parameter length is identical to the number of RC parameters divided by octet, i.e., 8 bits. That the length of the RC parameter is 'i' means that the RC parameter is analyzed i times in a unit of 8 bits. That is, the mobile terminal 170 sets the detected RC parameter length RC_LEN to RC_PARAMETERr[i] and then performs steps 915 to 921 and 933. This operation is repeated i times. Specifically, in step 915, the mobile terminal 170 determines whether the i value is less than the detected RC parameter length RC_LEN. Here, an initial i value is '0'. If the i value is larger than the RC parameter length, the mobile terminal proceeds to step 925, and otherwise, proceeds to step 917. In step 917, the mobile terminal 170 increases the i value by 1. After increasing the i value by 1, the mobile terminal 170 analyzes an $i^{th}$ RC parameter divided by 8 bits and executes a control command corresponding to the $i^{th}$ RC parameter, in step 919. After executing the control command, the mobile terminal 170 determines in step 921 whether the control command is successfully executed. If the control is successfully performed, the mobile terminal 170 sets the RESULT_CODE to '00000000' in step 933, and then returns to step 915. However, if the remote control is failed in step 921, the mobile terminal 170 sets the RESULT_CODE to a value indicating control failure in step 923.

In step 927, the mobile terminal 170 creates an RC message for informing the user of the control result. In the RC message, RC_TYPE field is set to '0010', RESULT_CODE field is set to the result code determined in the above process, SEC_CODE_LEN field is set to '00000000', and RC_LEN is also set to '00000000'. The created RC message is encapsulated as user data of the teleservice layer and then transmitted to the user through the SMS service, in step 927.

Figure 10A:
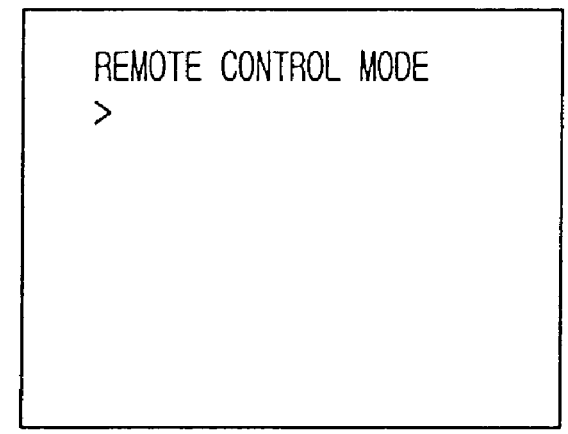
Figure 10B:
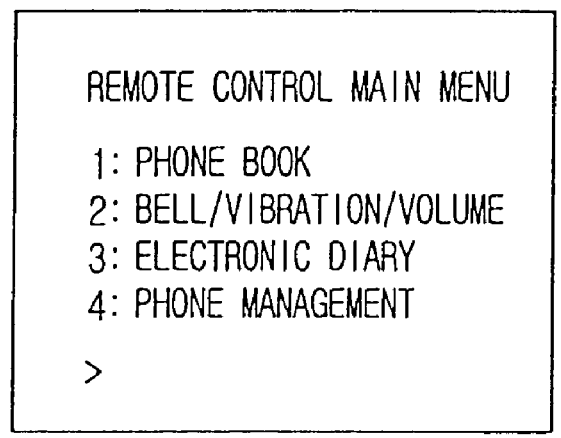

FIGS. 10A to 10D illustrate states displayed on a screen of the remote control requesting terminal (Client_T 160 or computer 150) according to an embodiment of the present invention. Specifically, FIG. 10A illustrates a screen state when the remote control mode is selected, and FIG. 10B illustrates a screen on which a Remote Control Main Menu is displayed after the remote control mode is selected in FIG. 10A. Further, FIG. 10C illustrates a screen on which a Phone Management Menu is displayed, and FIG. 10D illustrates a screen on which the execution result of a remote control command "Locking" from the Server_T is displayed. Although specific screen states are shown in FIGS. 10A-10D, other variations are within the scope of the present invention.

Figure 11:
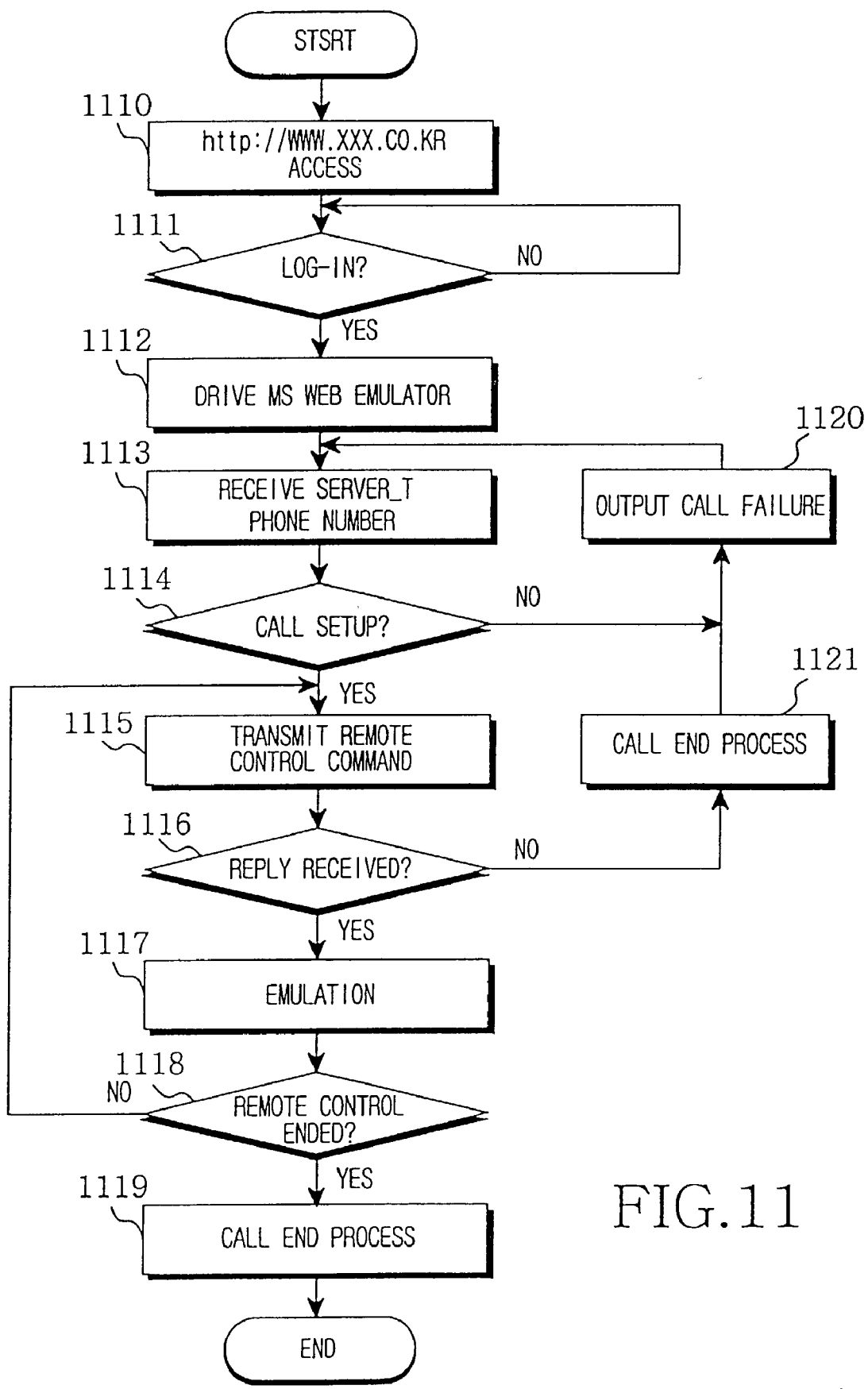
FIG. 11 illustrates an operating procedure of the MS web emulator for interactive remote control according to an embodiment of the present invention.

FIG. 11 illustrates an operating procedure of the MS web emulator for interactive remote control according to an embodiment of the present invention. Here, the mobile terminal serves as a Client_T. Of course, the operating procedure of FIG. 11 can be implemented using a computer.

Referring to FIG. 11, a user accesses a web site provided by the ISP 140 of FIG. 4 in step 1110. Here, the "user" refers to a user of the computer 150 or the mobile terminal 160, which serves as the Client_T. if a log-in procedure is successfully performed in step 1111, the Client_T drives an MS web emulator in step 1112. The Client_T inputs a phone number of the Server_T (e.g., a phone number of the mobile terminal 170) and then attempts to set up a call to the Server_T, in step 1113. A process for connecting the web emulator 145 to the MC 103 is similar to a general connection process between the web server and the MC, so a detailed description will not be made. Call setup requirements of the MC 103 and the Server_T are based on a call processing method in the remote control client mode and a call processing method in the remote control server mode.

The Client_T checks in step 1114 whether a call is successfully set up. If the call is successfully set up, the Client_T proceeds to step 1115. However, if the call is failed, the Client_T outputs a call failure message in step 1120 and then returns to step 1113. If the call is successfully set up, the Client_T transmits a remote control command to the Server_T in step 1115, and then awaits a reply from the Server_T for a reply waiting time in step 1116. For example, the remote control command may include a menu list (e.g., a list including phone book and message management) request.

Upon receipt of a reply from the Server_T, i.e., ACK and process result within the reply waiting time in step 1116, the Client_T proceeds to step 1117. However, upon failure to receive the reply from the Server_T, the Client_T ends the call in the same method as when the user requests the remote control end, in step 1121, and then proceeds to step 1120. Here, if the remote control command was a menu list request command, the "process result" means the requested menu list. The Client_T performs emulation according to the reply result from the Server_T and then awaits the user operation, in step 1117. Here, if the remote control command was a menu list request command, the "emulation" means outputting the menu list.

The Client_T determines in step 1118 whether the remote control is completed. If the remote control is not completed, the Client_T returns to step 1115. In other words, at the sight of the menu list, the user will select a specific menu (e.g., phone book) and searches its submenu (e.g., search by name), performing the remote control. For this operation, the Client_T should return to step 1115. However, when the user selects remote control end, the Client_T performs in step 1119 a call end process in the same method as when the user requests a remote call end.

Figure 12:
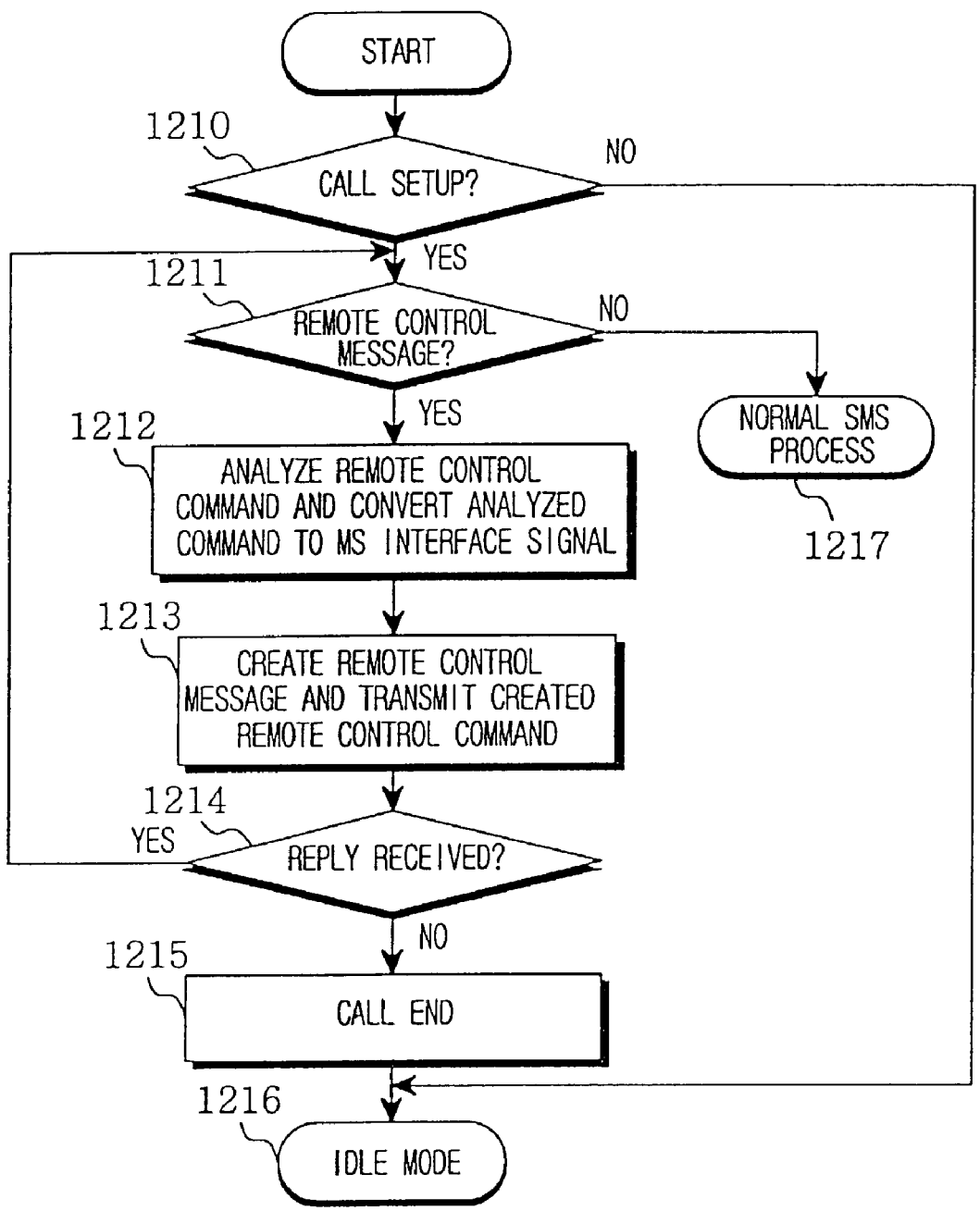
FIG. 12 illustrates an operating procedure of a mobile terminal (Server_T) for interactive remote control according to an embodiment of the present invention.

FIG. 12 illustrates an operating procedure of a mobile terminal (Server_T) for interactive remote control according to an embodiment of the present invention. Referring to FIG. 12, the Server_T determines in step 1210 whether a call is set up. If a call is set Lip, the Server_T detects the RC_TYPE field from the received SMS message and determines whether the detected value represents that the SMS message or a remote control message, in step 1211. If the RC_TYPE does not represent a remote control message, the Server_T performs a normal SMS process in step 1217.

However, if the RC_TYPE represents a remote control message, the Server_T analyzes the remote control message and converts the analyzed remote control message to an MS user interface signal, in step 1212. Then, a controller of the Server_T may recognize the remote control command as a control command received through its user interface. In step 1213, the Server_T creates a remote control message and transmits the created remote control message. Thereafter, the Server_T checks in step 1214 whether a reply is received within a reply waiting time. Upon receipt of a reply within the reply waiting time, the Server_T returns to step 1211. Otherwise, upon failure to receive a reply within the reply waiting time, the Server_T ends the call in step 1215 and then transitions to an idle mode in step 1216. Here, the "reply" does not mean the actual remote control command process result, but a reply option (ACK) of the transport layer. Meanwhile, if it is determined in step 1210 that a call is not set up, the Server_T also transitions to the idle mode in step 1216.

Figure 13:
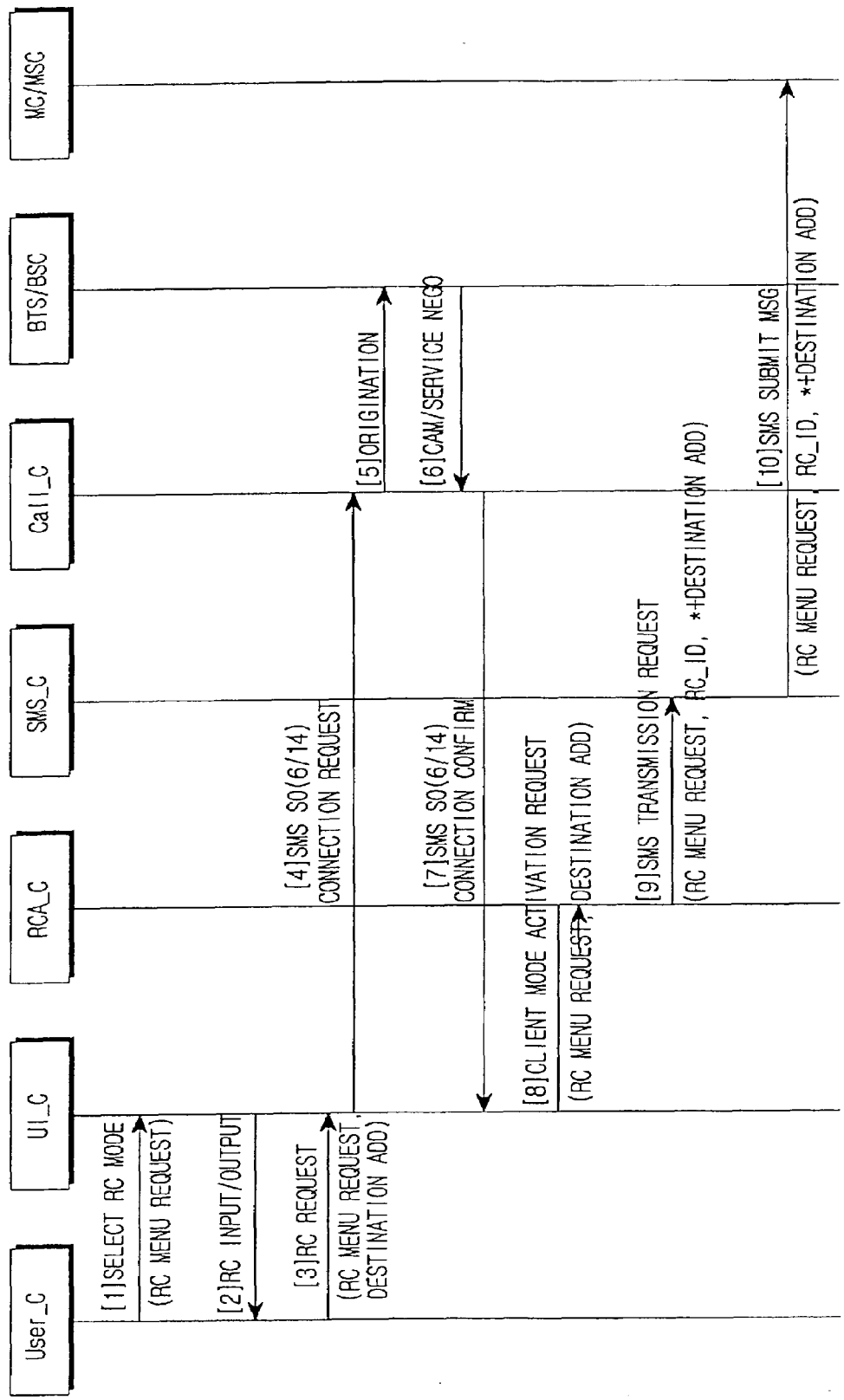
FIG. 13 is a ladder diagram illustrating a call process method among a mobile terminal operating in the remote control client mode, an SMS center, an MC, a base station and an MSC according to an embodiment of the present invention.

FIG. 13 is a ladder diagram illustrating a call process method among a mobile terminal operating in the remote control client mode, an SMS center, an MC, a base station and an MSC according to an embodiment of the present invention.

In step [1], the user selects a remote control mode so that the mobile terminal serves as a Client_T in order to perform remote control. In step [2], a user interface displays Remote Control Mode on its display unit as shown in FIG. 10A, and then awaits a destination address input by the user. In step [3], the user inputs a destination address of the Server_T and then presses SEND button. In step [4], the user interface transmits SMS Service Option (6/14) to the signaling layer to request connection of the SMS Service Option. In step [5], the signaling layer transmits an origination message to the BSC/BTS along with the SMS Service Option (6/14). In step [6], the BSC/BTS transmits an extended channel assignment message (ECAM) to the Client_T to establish a dedicated channel to the user interface, and makes a connection in the SMS Service Option through service negotiation. In step [7], if the Client_T is connected in the SMS Service Option (6/14), the signaling layer informs the user interface of connection of the SMS Service Option (6/14). In step [8], if the mobile terminal is in the remote control mode, the user interface informs the remote control application of connection of the SMS Service Option (6/14), and sends a remote control client mode activation request to the remote control application by setting the CHARi field of the user message subparameter to a remote control menu request and a destination address to a service number (*, +) of Server_T. The reference RCA_C indicates the remote control application of Client_T. In step [9], the remote control application is activated into the remote control client mode, sets the CHARi field of the user message subparameter to a remote control menu request, a destination address to a service number (*, +) of the Server_T, and a teleservice ID field to REMOTE_CONTROL_TELESERVICE_ID, and then transmits them the SMS protocol stack. In step [10], the SMS protocol stack transmits an SMS submit message to the MC after setting the CHARi field of the user message subparameter to a remote control menu request, a destination address to a service number (*, +) of the Server_T, the teleservice ID field to REMOTE_CONTROL_TELESERVICE_ID, and the USER_ACK_REQ field in a reply option subparameter to '1'.

Here, the SMS protocol stack recognizes the SMS origination message with a destination address beginning with '*' as an interactive teleservice, and transmits the SMS submit message of the interactive remote control teleservice. Even after the message transmission, the SMS protocol stack awaits an SMS deliver message from the network, instead of returning to the idle mode. The mobile terminal starts a remote control session as soon as the SMS submit message is transmitted.

Figure 14:
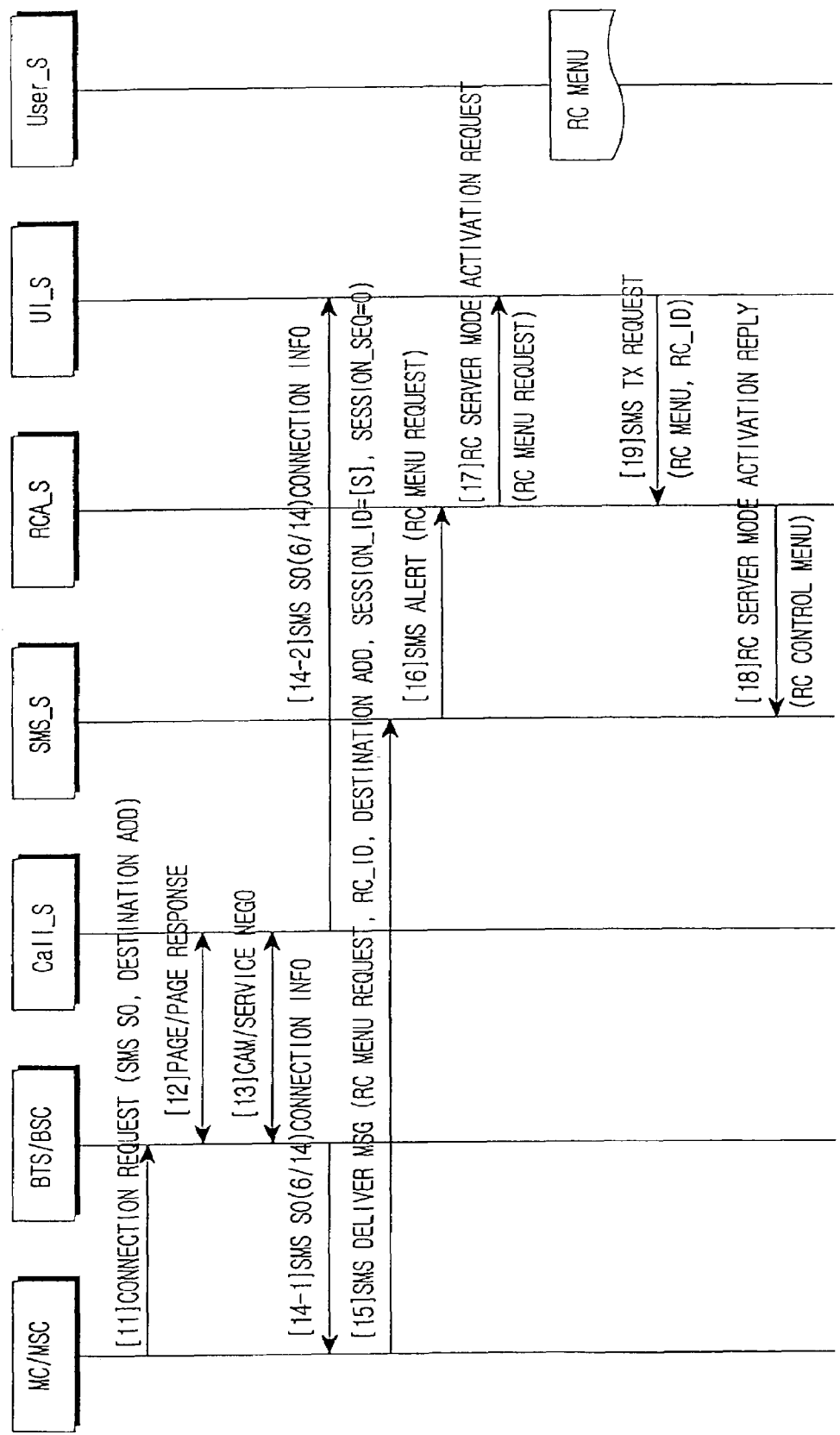
FIG. 14 is a ladder diagram illustrating a call processing method among a mobile terminal operating in the remote control server mode, an SMS center, a call processing center, a base station and an MSC according to an embodiment of the present invention.

FIG. 14 is a ladder diagram illustrating a call processing method among a mobile terminal operating in the remote control server mode, an SMS center, a call processing center, a base station and an MSC according to an embodiment of the present invention.

In step [11], the MC/MSC detects the current location of the Server_T based on SMS Service Option (6/14) and a service number of the Server_T, and sends a request for connection with the Server_T to the BTS/BSC where the Server_T is located. In step [12], the BTS/BSC transmits a general page message to the Server_T, and the Server_T transmits a page ACK message to the BSC/BTS along with the SMS Service Option (6/14). In step [13], the BSC/BTS establishes a dedicated channel to a user interface by transmitting an extended channel assignment message (ECAM) to the Server_T, and makes a connection in the SMS Service Option (6/14) through service negotiation. In step [14-1], the BSC/BTS informs the MC/MSC that the dedicated channel is established to the user interface of the Server_T. In step [14-2], a call processor of the Server_T informs the user interface of connection of the SMS Service Option. In step [15], the MC transmits the SMS submit message received from the Client_T to the Server_T as an SMS deliver message.

The MC transmits the SMS deliver message to the Server_T after setting the CHARi field of the user message subparameter to a remote control menu request, the teleservice ID to REMOTE_CONTROL_TELESERVICE_ID, the origination address to a service number of the Client_T, the SESSION_ID to a unique value [S], the SESSION_SEQ field to '0', and the USER_ACK_REQ to '1'. Upon receipt of an SMS submit message in which an initial teleservice ID is set to REMOTE_CONTROL_TELESERVICE_ID, the MC should create a unique value [S] to distinguish the SESSION_ID from the other sessions, and can use the SESSION_ID in addressing the Client_T and the Server_T.

In step [16], if the teleservice ID of the received SMS deliver message is REMOTE_CONTORL_TELESERVICE_ID, the SMS protocol stack of the Server_T sets the CHARi field of the user message subparameter to a remote control menu request, and transmits it to the remote control application. In step [17], the remote control application activates the remote control server mode, and then sends a remote control activation request to the user interface by setting CHARi of the user message subparameter to a remote control menu request. In step [18], when CHARi of the user message subparameter is set to a remote control menu request, the user interface sets the CHARi field of the user message subparameter to remote control menu information available for remote control, and the reply type and method (see Joint Specification for PCS Terminal Manufacturer-SMS function) to Menu, transmits them to the remote control application, and then awaits a user reply in the Remote Control Men. In step [19], the remote control application sets the CHARi field of the user message subparameter to remote control menu information, the reply type and method (see Joint Specification for PCS Terminal Manufacturer-SMS function) to Menu, and the teleservice ID to REMOTE_CONTROL_TELESERVICE_ID, and then transmits them to the SMS protocol stack.

The mobile terminal may previously set the remote control menu information. When the remote control menu is not set, the mobile terminal may operate in a default menu.

Figure 15A:
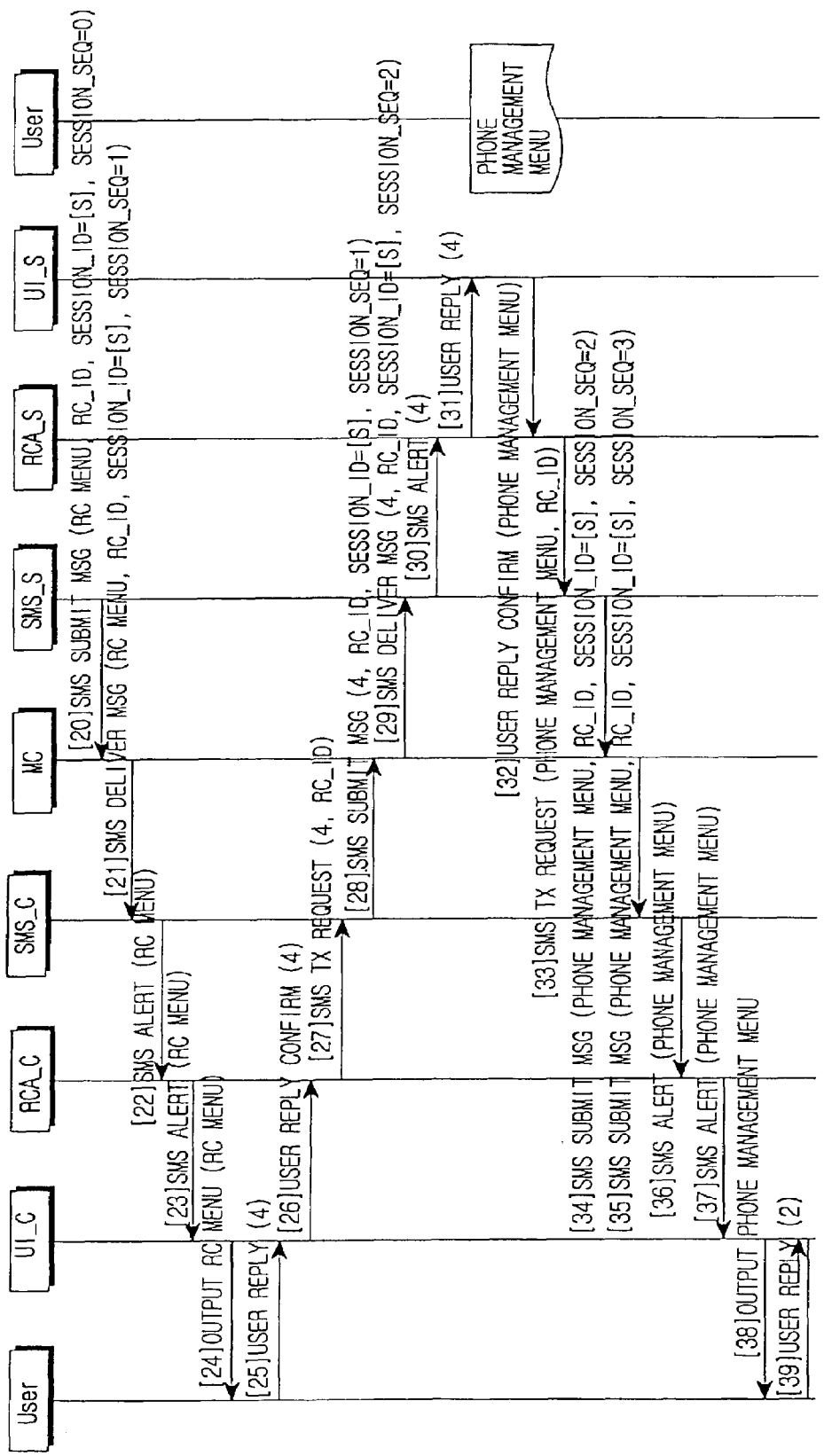
FIGS. 15A to 15C are ladder diagrams illustrating an actual interactive remote control teleservice process according to an embodiment of the present invention.
Figure 15B:
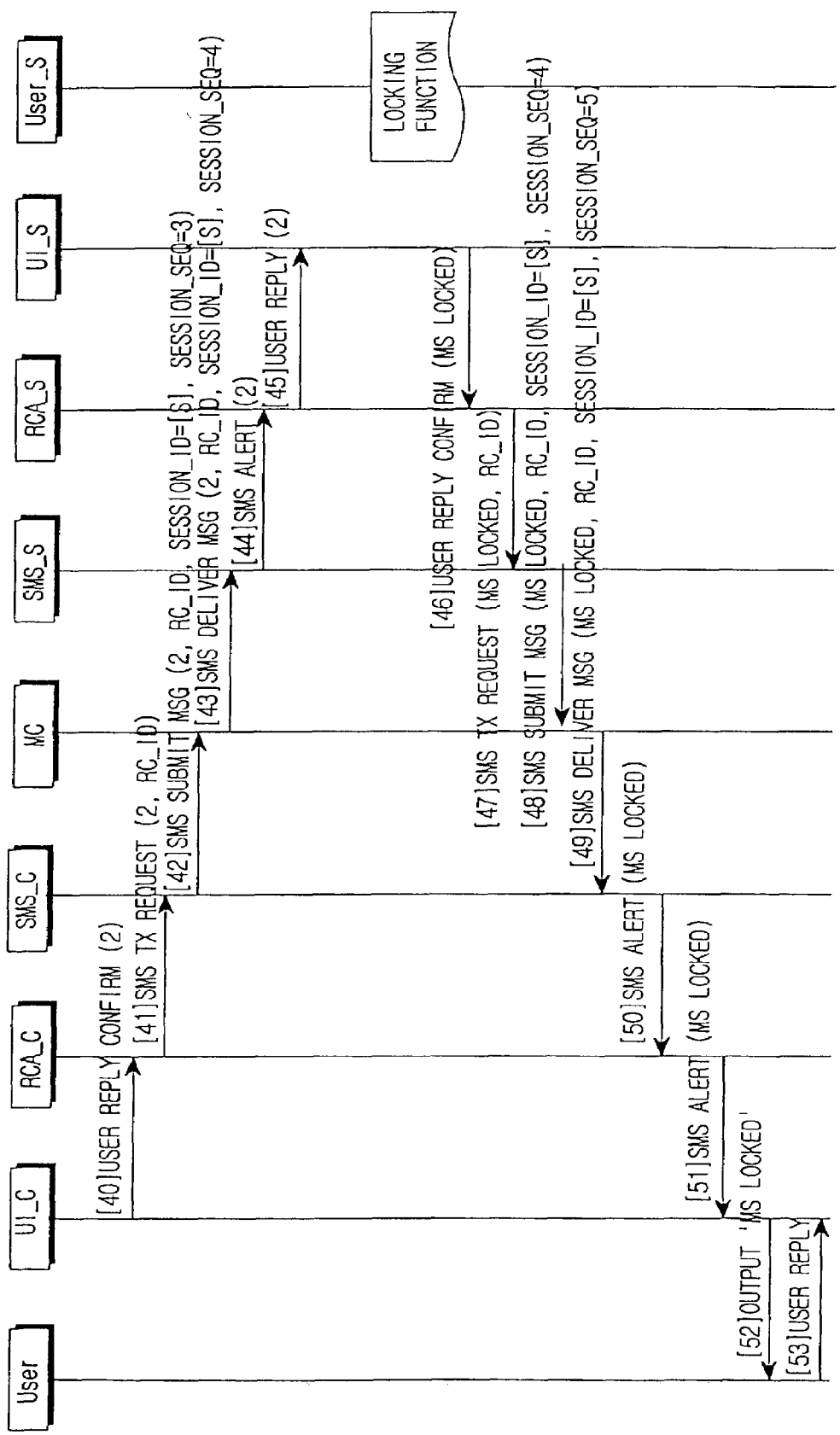
Figure 15C:
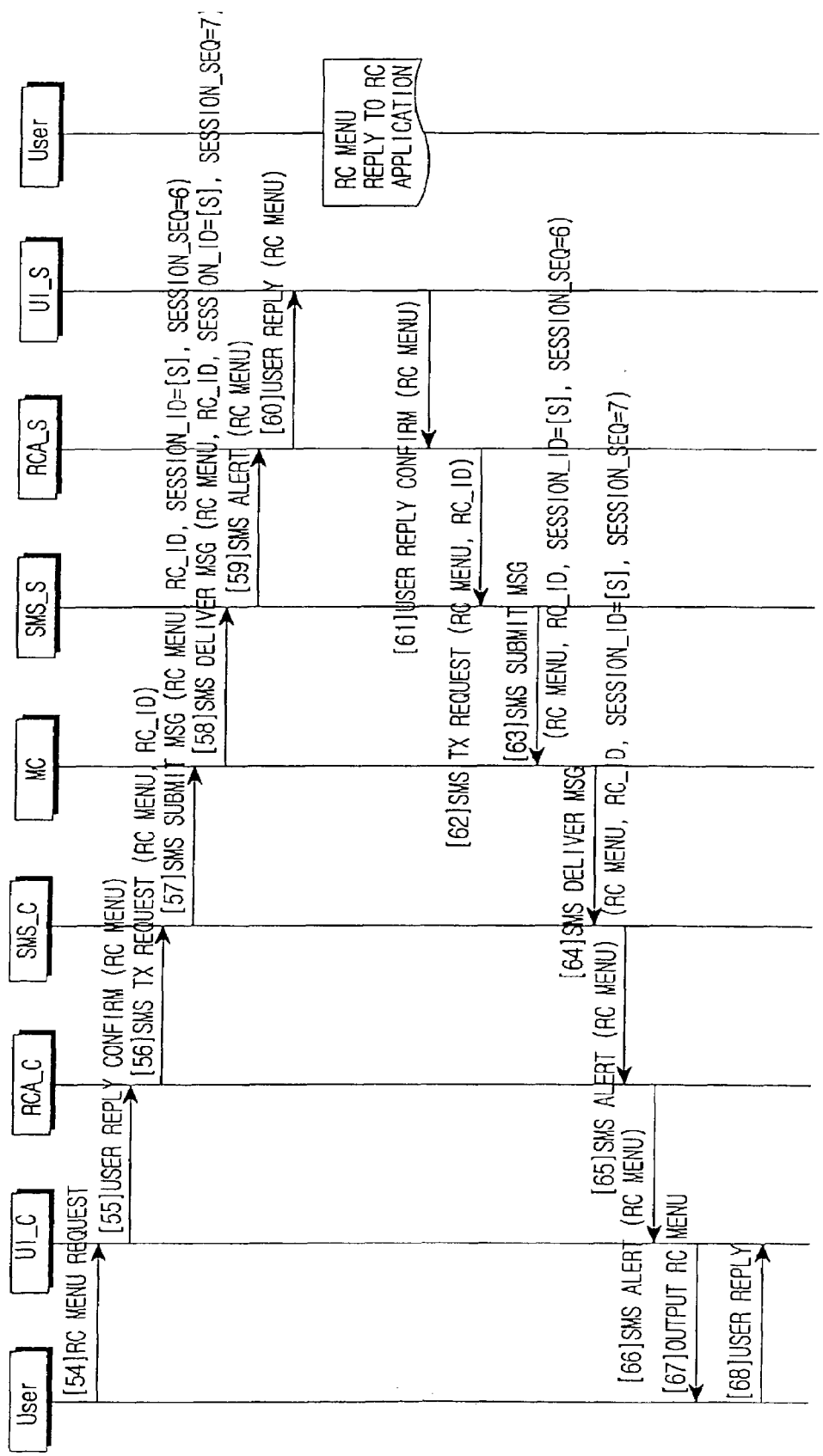

FIGS. 15A to 15C are ladder diagrams illustrating an actual interactive remote control teleservice process according to an embodiment of the present invention.

Referring to FIG. 15A, in step [20], the SMS protocol stack transmits an SMS submit message to the MC by setting the CHARi field of the user message subparameter to the remote control menu information, the teleservice ID to REMOTE_CONTROL_TELESERVICE_ID, the SESSION_ID to a unique value [s], the SESSION_SEQ field to a received value (0), the reply type and method to Menu, and the USER_ACK_REQ to '1'. The remote control menu provided by the Server_T will be assumed as follows.

Remote Control Main Menu
1: Phone Book
2: Bell/Vibration/Volume
3: Electronic Diary
4: Phone Management In step [21], the MC transmits an SMS deliver message to the Client_T by setting the CHARi field of the user message subparameter to remote control menu information, the teleservice ID to REMOTE_CONTROL_TELESERVICE_ID, the SESSION_ID to a unique value [S], the SESSION_SEQ field to [(SESSION_SEQr+1) modulo 8], the reply type and method to Menu, and USER_ACK_REQ to '1' based on the SESSION_ID (unique value [S]) of the received SMS submit message. In step [22], upon receipt of the SMS deliver message from the MC, the SMS protocol stack of the Client_T transmits the remote control menu information and the CHARi of the user message subparameter if the teleservice ID is REMOTE_CONTROL_TELESERVICE_ID. In step [23], the remote control application transmits the received message to the user interface, since it is in the remote control client mode. In step [24], since the reply type and method of the received message is set to Menu, the user interface awaits user's input after displaying 'Remote Control Main Menu' and '1: Phone Book, 2: Bell/Vibration/Volume, 3: Electronic Diary, 4: Phone Management' on its display as shown in FIG. 10B, and setting a digit input mode. Here, the "digit input mode" refers to a user interface operation mode where the user can input only arrow keys and digit keys.

Next, a description will be made of an operation of steps [25] to [38] in which the user reply is '4'.

In step [25], the user selects '4' as a reply. In step [26], since the user interface is in the remote control client mode, it sets the CHARi field of the user message subparameter to '4' and then transmits it to the remote control application. In step [27], the remote control application sets the CHARi field of the user message subparameter to '4' and the teleservice ID to REMOTE_COTROL_TELESERVICE_ID, and then transmits them to the SMS protocol stack. In step [28], the SMS protocol stack transmits an SMS submit message to the MC by setting the CHARi field of the user message subparameter to '4', the teleservice ID to REMOTE_COTROL_TELESERVICE_ID, the SESSION_ID to the unique value [S], the SESSION_SEQ to a received value (1), the USER_ACK_REQ to '1'. In step [29], the MC transmits the SMS submit message received from the Client_T to the Server_T as an SMS deliver message by setting the CHARi field of the user message subparameter to '4', the teleservice ID to REMOTE_COTROL_TELESERVICE_ID, the SESSION_ID to a unique value [S], the SESSION SEQ field to SESSION_SEQs, and the USER_ACK_REQ to '1'. In step [30], upon receipt of the SMS deliver message from the MC, the SMS protocol stack of the Server_T transmits the CHARi field of the user message subparameter filled with '4' to the remote control application, if the teleservice ID is REMOTE_COTROL_TELESERVICE_ID. In step [31], the remote control application of the Server_T awaits a reply form the user interface after generating the same event as if the user of the Server_T inputs a '4'-key according to a definition of the user interface based on the value '4' in the CHARi field of the user message subparameter. At the moment, the user interface waits user's input in the remote control menu. In step [32], since the user interface in the remote control server mode, it replies to the remote control application by setting the CHARi field of the user message subparameter to Phone Management Menu and the reply type and method to Menu, instead of displaying the selected submenu 'Phone Management'.

The remote control menu provided by the Server_T will be assumed as follows.
Phone Management Menu
1: Power Off
2: Locking
3: Emergency Call In step [33], the remote control application sets the CHARi of the user message subparameter to Phone Management Menu, the reply type and method to Menu, and the teleservice ID to REMOTE_COTROL_TELESERVICE_ID, and then transmits them to the SMS protocol stack. In step [34], the SMS protocol stack sets the CHARi of the user message subparameter to Phone Management Menu, the reply type and method to Menu, the teleservice ID to REMOTE_COTROL_TELESERVICE_ID, the SESSION_ID to the unique value [S], the SESSION_SEQ field to SESSION_SEQs, and the USER_ACK_REQ to '1', and transmits them to the MC. In step [35], the MC transmits the SMS submit message received from the Server_T to the Client_T as an SMS deliver message by setting the CHARi field of the user message subparameter to Phone Management Menu, the teleservice ID to REMOTE_COTROL_TELESERVICE_ID, the SESSION_ID to the unique value [S], the SESSION_SEQ field to SESSION_SEQs, and the USER_ACK_REQ to '1'. In step [36], upon receipt of the SMS deliver message from the MC, the SMS protocol stack of the Client_T analyzes the SESSION_ID and the SESSION_SEQ and then transmits the CHARi of the user message subparameter set to Phone Management Menu, if the teleservice ID is REMOTE_COTROL_TELESERVICE_ID. In step [37], the remote control application transmits the received message to the user interface, since it is in the remote control client mode. In step [38], since the reply type and method of the received message is set to Menu, the user interface waits user's input after displaying 'Phone Management Menu' and '1: Power Off, 2: Locking, 3: Emergency Call' and then setting the user interface to the digit input mode.

Next, a description will be made of an operation of steps [39] to [52] in FIGS. 15A and 15B, in which the user reply is '2'.

In step [39], the user selects '2' as a reply. In step [40], the user interface sets the CHARi field of the user message subparameter to '2' and transmits it to the remote control application. In step [41], the remote control application sets the CHARi field of the user message subparameter to '2' and the teleservice ID to REMOTE_COTROL_TELESERVICE_ID, and transmits them to the SMS protocol stack. In step [42], the SMS protocol stack transmits an SMS submit message to the MC by setting the CHARi field of the user message subparameter to '2', the teleservice ID to REMOTE_COTROL_TELESERVICE_ID, the SESSION_ID to the unique value [S], the SESSION_SEQ field to the SESSION_SEQs, and the USER_ACK_REQ to '1'. In step [43], the MC transmits the SMS submit message received from the Client_T to the Server_T as an SMS deliver message by setting the CHARi field of the user message subparameter to '2', the teleservice ID to REMOTE_COTROL_TELESERVICE_ID, the SESSION_ID to the unique value [S], the SESSION_SEQ field to SESSION_SEQs, and the USER_ACK_REQ to '1'. In step [44], upon receipt of the SMS deliver message from the MC, the SMS protocol stack of the Server_T analyzes the SESSION_ID and the SESSION_SEQ and then transmits it to the remote control application if the teleservice ID is REMOTE_COTROL_TELESERVICE_ID. In step

[45], the remote control application of the Server_T generates the same event as when the user of the Server_T inputs the '2'-key according to a definition of the user interface based on the value '2' in the CHARi field of the user message subparameter, and then awaits a reply from the user interface. At the moment, the user interface awaits a user's reply in the Phone Management Menu.

In step [46], since the user interface is in the remote control server mode, it performs a 'Locking' operation, and then sets the CHARi to 'Locked' and sends it to the remote control application as a reply, instead of displaying the operation result on the LCD. In step [47], the remote control application sets the CHARi of the user message subparameter to 'Locked' and the teleservice ID to REMOTE_COTROL_TELESERVICE_ID, and transmits them to the SMS protocol stack. In step [48], the SMS protocol stack sets the CHARi of the user message subparameter to 'Locked', the teleservice ID to REMOTE_COTROL_TELESERVICE_ID, the SESSION_ID to the unique value [S], the SESSION_SEQ field to SESSION_SEQs, and USER_ACK_REQ to '1', and transmits them to the MC. In step [49], the MC transmits the SMS submit message to the Client_T as an SMS deliver message by setting the CHARi of the user message subparameter to 'Locked', the teleservice ID to REMOTE_COTROL_TELESERVICE_ID, the SESSION_ID to the unique value [S], the SESSIO_SEQ field to SESSION_SEQs, and the USER_ACK_REQ to '1'. In step [50], upon receipt of the SMS deliver message form the MC, the SMS protocol stack of the Client_T analyzes SESSION_ID and the SESSION_SEQ, and then transmits the CHARi of the user message subparameter filled with 'Locked' to the remote control application, if the teleservice ID is REMOTE_COTROL_TELESERVICE_ID. In step [51], since the remote control application is in the remote control client mode, it transmits the received message to the user interface. In step [52], the user interface awaits user's input after displaying 'Locked' on its display as shown in FIG. 10D. In step [53], if the user selects Remote Control Menu Request, the procedure proceeds to step [54], and if the user selects Remote Control End, the procedure proceeds to step [69].

Next, a description will be made of an operation of steps [54] to [68] shown in FIG. 15C, in which the user selects Remote Control Menu Request.

In step [54], the user selects Remote Control Menu Request. In step [55], when the mobile terminal is in the remote control mode, the user interface sets the CHARi field of the user message subparameter to Remote Control Menu Request and transmits it to the remote control application. In step [56], the remote control application sets the CHARi of the user message subparameter to Remote Control Menu Request and the teleservice ID to REMOTE_COTROL_TELESERVICE_ID, and then transmits them to the SMS protocol stack. In step [57], the SMS protocol stack transmits an SMS submit message to the MC by setting the CHARi of the user message subparameter to Remote Control Menu Request, the teleservice ID to REMOTE_COTROL_TELESERVICE_ID, the SESSION_ID to the unique value [S], the SSESSION_SEQ field to SESSION_SEQs, and the USER_ACK_REQ to '1'. In step [58], the MC transmits the SMS submit message received form the Client_T to the Server_T as an SMS deliver message by setting the CHARi field of the user message subparameter to Remote Control Menu Request, the teleservice ID to REMOTE_COTROL_TELESERVICE_ID, the SESSION_ID to the unique value [S], the SESSION_SEQ field to the SESSION_SEQs, and the USER_ACK_REQ to '1'. In step [59], upon receipt of the SMS deliver message from the MC, the SMS protocol stack of the Server_T analyzes the SESSION_ID and the SESSION_SEQ, and then transmits them to the remote control application if the teleservice ID is REMOTE_COTROL_TELESERVICE_ID. In step [60], the remote control application of the Server_T generates the same event as when the user of the Server_T inputs a Remote Control Menu Request key according to a definition of the user interface based on the CHARi field of the user message subparameter filled with Remote Control Menu Request, and then awaits a reply from the user interface. At the moment, the user interface awaits a user's reply in Initial Screen after locking the mobile terminal.

In step [61], since the user interface is in the remote control server mode, it performs MS Locking operation, and then sets the CHARi field to Remote Control Menu Information and transmits it to the remote control application as a reply, instead of displaying the execution result on the LCD. In step [62], the remote control application sets the CHARi of the user message subparameter to Remote Control Menu and the teleservice ID to REMOTE_COTROL_TELESERVICE_ID, and transmits them to the SMS protocol stack. In step [63], the SMS protocol stack sets the CHARi of the user message subparameter to Remote Control Menu, the teleservice ID to REMOTE_COTROL_TELESERVICE_ID, the SESSION_ID to the unique value [S], the SESSION_SEQ to SESSION_SEQs, and the USER_ACK_REQ '1'. In step [64], the MC transmits the SMS submit message received from the Server_T to the Client_T as an SMS deliver message by setting the CHARi of the user message subparameter to Remote Control Menu, the teleservice ID to REMOTE_COTROL_TELESERVICE_ID, the SESSION_ID to the unique value [S], the SESSION_SEQ field to the SESSION_SEQs, and the USER_ACK_REQ to '1'. In step [65], upon receipt of the SMS deliver message from the MC, the SMS protocol stack of the Client_T analyzes the SESSION_ID and the SESSION_SEQ and then transmits the CHARi of the user message subparameter filled with Remote Control Menu to the remote control application, if the teleservice ID is REMOTE_COTROL_TELESERVICE_ID. In step [66], since the remote control application is in the remote control client mode, it transmits the received message to the user interface. In step [67], the user interface waits a user's input after displaying 'Remote Control Main Menu' and '1: Phone Book, 2: Bell/Vibration/Volume, 3: Electronic Diary, 4: Phone Management' on its display as shown in FIG. 10B, and setting the digit input mode. In step [68], if the user selects Remote Control End as a reply, then the procedure proceeds to step [69].

Figure 16:
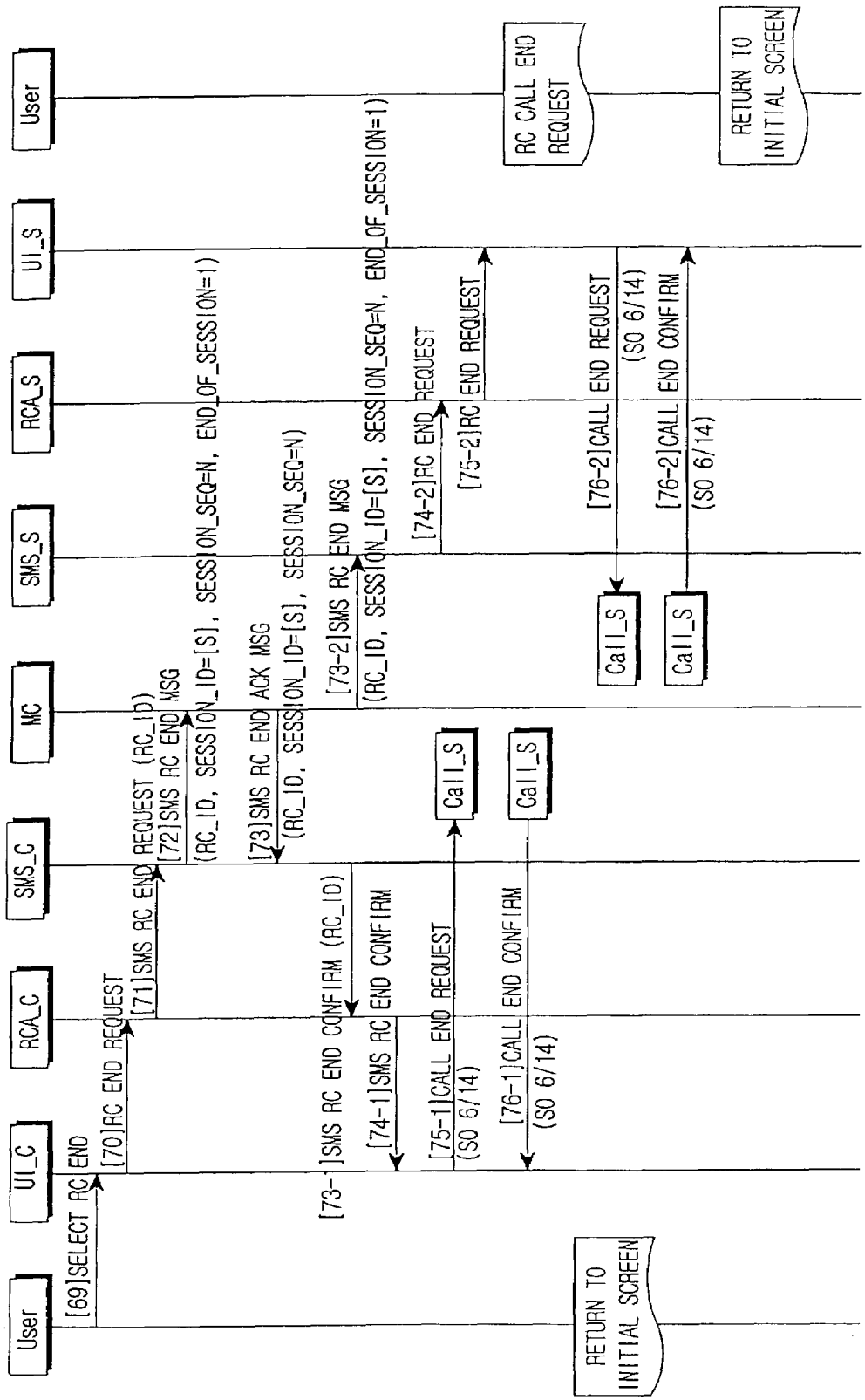
FIG. 16 is a ladder diagram illustrating an operation according to an embodiment of the present invention in which a user requests Remote Control End.

FIG. 16 is a ladder diagram illustrating an operation according to an embodiment of the present invention in which a user requests Remote Control End.

In step [69], the user inputs an END button. In step [70], the user interface sends a remote control end request to the remote control application. In step [71], the remote control application sets the teleservice ID to REMOTE_COTROL_TELESERVICE_ID, and then sends a remote control end request to the SMS protocol stack. In step [72], the SMS protocol stack transmits an SMS conversation end message to the MC by setting the teleservice ID to REMOTE_COTROL_TELESERVICE_ID, the SESSION_ID to the unique value [S], the SESSION_SEQ to SESSION_SEQs, the END_OF_SESSION to '1' and the USER_ACK_REQ to '1', and then awaits an SMS conversation end ACK message. In step [73-1], upon receipt of a remote control end ACK, the SMS protocol stack sends a remote control end confirm to the remote control application if the teleservice ID is REMOTE_COTROL_TELESERVICE_ID. In step [74-1], upon receipt of the remote control end confirm from the user interface, the remote control application informs the user interface of an end of the remote control, and then returns to a previous mode of a state where the remote control client mode activation mode is activated. In step [75-1], the user interface transmits an interactive remote control teleservice call end request for the SMS Service Option (6/14) to a call processor. In step [76-1], the call processor releases SMS SO (6/14) call, sends a call end confirm to the user interface, and then transitions to an idle mode. Further, the user interface returns to its initial screen. In step [73-2], upon receipt of an SMS conversation end message from the Client_T, the MC transmits an SMS remote control end message to the Server_T by setting the teleservice ID to REMOTE_COTROL_TELESERVICE_ID, the SESSION_ID to the unique value [S], the SESSION_SEQ to SESSION_SEQs, and the USER_ACK_REQ to '1'. In step [74-2], upon receipt of the SMS remote control end message from the MC, the SMS protocol stack of the Server_T analyzes the SESSION_ID and the SESSION_SEQ, and then sends a remote control end request to the remote control application, if the teleservice ID is REMOTE_COTROL_TELESERVICE_ID. In step [75-2], the remote control application of the Server_T generates the same event as when the user of the Server_T inputs an END key according to a definition of the user interface in response to the received remote control end request, and then returns to a previous mode of a state when the remote control mode is activated. In step [75-2], the user interface transmits an SMS SO (6/14) interactive remote control teleservice call end request to the call processor. In step [76-2], the call processor releases an SMS SO (6/14) call, sends a call end confirm to the user interface, and then transitions to the idle mode. Thereafter, the user interface returns to its initial screen.

As described above, the present invention enables the user to control his or her mobile terminal at a remote place and access information stored in the mobile terminal through an interactive remote control service. Therefore, even when the user loses or fails to carry the mobile terminal, he or she can control the mobile terminal at the remote place. When the invention is provided with the GPS service, it is also possible to detect a location of the mobile terminal by performing mobile origination for the GPS service even at a remote place. Therefore, when the mobile terminal or a child carrying the mobile terminal is missing, the user can easily recognize the place where the missing mobile terminal or child is located. In addition, the user can turn off or lock the mobile terminal at a remote place. Besides, the user can also access such information as a specific phone number stored in the mobile terminal. In other words, the user can freely control all the functions of the mobile terminal even at the remote place. In addition, it is also possible to provide a remote diagnostic service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for remotely controlling a mobile terminal in a mobile communication system, comprising:
the mobile terminal for receiving a control command through a radio link and performing an operation according to the received control command, the mobile terminal operating based on a layer structure in which a remote control layer exists on a teleservice layer; and
an Internet service provider including a remote control emulator, for transmitting a remote control command to the mobile terminal through the radio link upon receipt of the remote control command through a user interface of the remote control emulator,
wherein the user interface of the remote control emulator provides a fully interactive user interface to a user to control a plurality of functions of the mobile terminal, wherein the remote control layer includes a remote control type field indicating whether a character field of user data of a teleservice layer represents an SMS message or a remote control message, a result code field indicating a remote control process result for the mobile terminal, a security code length field, a security code field indicating whether remote control access to the mobile terminal is available, a remote control parameter length field, and a remote control information parameter field.

2. The system as claimed in claim 1, wherein the radio link is a voice link.

3. The system as claimed in claim 1, wherein the radio link is an SMS (Short Message Service) link.

4. The system as claimed in claim 1, wherein the radio link is a data link.

5. The system as claimed in claim 1, wherein the mobile terminal transmits a remote control process result to the Internet service provider through the radio_ink.

6. The system as claimed in claim 1, wherein the user is connected to the Internet service provider through another mobile terminal.

7. The system as claimed in claim 1, wherein the user is connected to the Internet service provider through a computer.

8. The system as claimed in claim 1, wherein the web emulator operates based on layer structure in which a remote control layer exists on a teleservice layer.

9. The system as claimed in claim 8, wherein the remote control layer includes a remote control type field indicating whether a character field of user data of a teleservice layer represents an SMS message or a remote control message, a result code field indicating a remote control process result for the mobile terminal, a security code length field, a security code field indicating whether remote control access to the mobile terminal is available, a remote control parameter length field, and a remote control information parameter field.

10. The system as claimed in claim 1, wherein the mobile terminal includes a remote control application for converting a remote control command or a remote control process result to a user interface signal of the mobile terminal.

11. A method for remotely controlling a mobile terminal through an Internet service provider connected to a mobile communication system providing a short message services, comprising the steps of:
(a) driving a mobile terminal web emulator by logging in through a client terminal, the mobile terminal operating based on a layer structure in which a remote control layer exists on a teleservice layer;
(b) setting up a call by inputting a phone number of a remote server terminal after driving the mobile terminal web emulator;
(c) outputting a remote control main menu provided by the remote server terminal through the set call and transmitting a remote control command to a remote control server; and
(d) performing emulation according to a reply received from the remote control server within a prescribed time, wherein a user interface of the client terminal provides a fully interactive user interface to a user to control a plurality of functions of the mobile terminal, wherein the remote control layer includes a remote control type field indicating whether a character field of user data of a teleservice layer represents an SMS message or a remote control message, a result code field indicating a remote control process result for the mobile terminal, a security code length field, a security code field indicating whether remote control access to the mobile terminal is available, a remote control parameter length field, and a remote control information parameter field.

12. The method as claimed in claim 11, further comprising the steps of:
   determining whether the remote control is completed;
   ending the call, when the remote control is completed; and
   returning to the step (c), when the remote control is not completed.

13. A mobile terminal comprising:
   a user interface having a remote control application which is activated in a remote control client mode when an origination call is connected to an interactive remote control teleservice in an SMS service option, and is activated in a remote control server mode when a call from a network is connected to the interactive remote control teleservice in the SMS service option,
   wherein the interactive remote control teleservice provides a fully interactive user interface to a user to control a plurality of functions of the mobile terminal, which operates based on a layer structure in which a remote control layer exists on a teleservice layer: and the remote control layer includes a remote control type field indicating whether a character field of user data of a teleservice layer represents an SMS message or a remote control message, a result code field indicating a remote control process result for the mobile terminal, a security code length field, a security code field indicating whether remote control access to the mobile terminal is available, a remote control parameter length field, and a remote control information parameter field.

* * * * *